(12) United States Patent
Van Buskirk et al.

(10) Patent No.: US 11,857,924 B2
(45) Date of Patent: Jan. 2, 2024

(54) PHOTOCATALYTIC FLUIDIZED BED REACTOR SYSTEMS

(71) Applicants: Peter C. Van Buskirk, Newtown, CT (US); Trevor E. James, Plantsville, CT (US); Melissa A. Petruska, Newtown, CT (US); Jeffrey F. Roeder, Brookfield, CT (US)

(72) Inventors: Peter C. Van Buskirk, Newtown, CT (US); Trevor E. James, Plantsville, CT (US); Melissa A. Petruska, Newtown, CT (US); Jeffrey F. Roeder, Brookfield, CT (US)

(73) Assignee: Sonata Scientific LLC, Danbury, CT (US)

( * ) Notice: Subject to any disclaimer, the term of this patent is extended or adjusted under 35 U.S.C. 154(b) by 0 days.

(21) Appl. No.: 16/987,386

(22) Filed: Aug. 6, 2020

(65) Prior Publication Data

US 2020/0360857 A1 Nov. 19, 2020

Related U.S. Application Data

(63) Continuation-in-part of application No. 16/680,495, filed on Nov. 12, 2019, which is a
(Continued)

(51) Int. Cl.
*B01J 35/00* (2006.01)
*B01J 35/02* (2006.01)
(Continued)

(52) U.S. Cl.
CPC ....... *B01D 53/8668* (2013.01); *B01D 53/007* (2013.01); *B01J 35/004* (2013.01);
(Continued)

(58) Field of Classification Search
CPC .... B01J 35/004; B01J 35/026; B01J 35/1014; B01J 35/1019; B01J 35/1023; B01J 35/1061; B01D 53/007; B01D 53/8668
See application file for complete search history.

(56) References Cited

U.S. PATENT DOCUMENTS 5,194,161 A * 3/1993 Heller .................... B01J 35/004
 210/748.09
5,244,811 A * 9/1993 Matthews ............ G01N 31/005
 422/80

(Continued)

OTHER PUBLICATIONS

MLV De Chiara, ML Amodio, F Scura, L Spremulli, G Colelli, Design and preliminary test of a fluidised bed photoreactor for ethylene oxidation on mesoporous mixed SiO2/TiO2 nanocomposites under UV-A illumination, Journal of Agricultural Engineering, 2014, vol. XLV:435.

(Continued)

*Primary Examiner* — Cam N. Nguyen
(74) *Attorney, Agent, or Firm* — Gregory Stauf

(57) ABSTRACT

The Invention describes photocatalytic reactor systems that employ fluidization of the photocatalyst. These systems are useful for performing chemical transformations on a chemical containing fluid, including for VOCs. Aspects of the invention include non-imaging optics, abrasion resistant coatings and photoreactor designs.

24 Claims, 11 Drawing Sheets

Related U.S. Application Data continuation-in-part of application No. 16/212,663, filed on Dec. 6, 2018, now Pat. No. 11,052,385, which is a continuation-in-part of application No. 16/147,536, filed on Sep. 28, 2018.

(60) Provisional application No. 62/883,286, filed on Aug. 6, 2019, provisional application No. 62/760,428, filed on Nov. 13, 2018, provisional application No. 62/595,261, filed on Dec. 6, 2017, provisional application No. 62/564,408, filed on Sep. 28, 2017.

(51) Int. Cl.
    *B01J 35/10* (2006.01)
    *B01D 53/00* (2006.01)
    *B01D 53/86* (2006.01)
    *C02F 1/72* (2023.01)
    *C02F 101/32* (2006.01)
    *C02F 1/32* (2023.01)

(52) U.S. Cl.
    CPC ......... *B01J 35/026* (2013.01); *B01J 35/1014* (2013.01); *B01J 35/1019* (2013.01); *B01J 35/1023* (2013.01); *B01J 35/1061* (2013.01); *B01D 2255/802* (2013.01); *B01D 2255/9202* (2013.01); *B01D 2255/9207* (2013.01); *B01D 2257/708* (2013.01); *B01D 2257/7022* (2013.01); *C02F 1/32* (2013.01); *C02F 1/725* (2013.01); *C02F 2101/322* (2013.01); *C02F 2201/3222* (2013.01); *C02F 2305/10* (2013.01)

(56) References Cited

U.S. PATENT DOCUMENTS

| | | | | |
|---|---|---|---|---|
| 5,439,652 | A * | 8/1995 | Sczechowski | B01D 53/8668 422/186 |
| 5,865,959 | A * | 2/1999 | Meinzer | B60H 3/06 423/245.3 |
| 6,736,976 | B2 | 5/2004 | Kantzas | |
| 6,752,957 | B1 * | 6/2004 | De Lasa | B01D 53/007 422/186.3 |
| 6,887,816 | B2 * | 5/2005 | Tanaka | B01J 21/063 428/220 |
| 6,902,653 | B2 * | 6/2005 | Carmignani | C02F 1/325 422/186 |
| 7,473,481 | B2 * | 1/2009 | MacPhee | H01M 8/1009 429/111 |
| 9,017,613 | B2 | 4/2015 | Owen | |
| 9,579,523 | B2 | 2/2017 | Bourke, Jr. | |
| 9,938,165 | B2 * | 4/2018 | Taghipour | C02F 1/725 |
| 10,293,072 | B2 * | 5/2019 | Taghipour | B01D 53/8668 |
| 10,829,394 | B2 * | 11/2020 | Taghipour | H05K 1/0204 |
| 11,154,836 | B2 * | 10/2021 | Taghipour | C02F 1/325 |
| 2003/0085111 | A1 | 5/2003 | Tabatabaie-Raissi | |
| 2005/0163673 | A1 | 7/2005 | Johnson | |
| 2010/0221166 | A1 | 9/2010 | Muggli | |
| 2011/0123423 | A1 | 5/2011 | Ciambelli | |
| 2013/0168228 | A1 * | 7/2013 | Ozin | B01J 23/755 204/157.9 |
| 2014/0217036 | A1 * | 8/2014 | Bremer | C02F 1/725 210/748.14 |
| 2021/0178377 | A1 * | 6/2021 | Khatiwada | B01J 19/0053 |
| 2021/0178378 | A1 * | 6/2021 | Khatiwada | B01J 19/0013 |
| 2021/0339220 | A1 * | 11/2021 | Khatiwada | C02F 1/325 |

OTHER PUBLICATIONS

MH Baek, JW Yoon, JS Hong, JK Suh, Application of $TiO_2$-containing mesoporous spherical activated carbon in a fluidized bed photoreactor—Adsorption and photocatalytic activity, Applied Catalysis A: General, 2013, 222-229, vol. 450.

V Palma, D Sannino, V Valano, P Ciamelli, Fluidized bed reactor for the intensification of gas-phase oxidative dehydrogenation of cyclohexane, Industrial Engineering & Chemical Research, 2010, 10279-10286, vol. 49.

TH Lim, SD Kim, Photocatalytic degradation of trichloroethylene (TCE) over $TiO_2$/silica gel in a circulating fluidized bed (CFB) photoreactor, Chemical Engineering and Processing, 2005, 327-334, vol. 44.

M Zhang, T An, J Fu, G Sheng, X Wang, X Hu, X Ding, Photocatalytic degradation of mixed gaseous carbonyl compounds at low level on adsorptive $TiO_2/SiO_2$ photocatalyst using a fluidized bed reactor, Chemosphere, 2006, 423-431, vol. 64.

D Geldart, The effect of particle size and size distribution on the behaviour of gas-fluidised beds, Powder Technology, 1971, 201-215, vol. 6.

D Geldart, Types of gas fluidization, Powder Technology, 1973, 285-292, vol. 7.

O Prieto, J Fermoso, R Irusta, Photocatalytic degradation of toluene in air using a fluidized bed photoreactor, International Journal of Photoenergy, 2007, 32859.

* cited by examiner (d)

a)

b)

PHOTOCATALYTIC FLUIDIZED BED REACTOR SYSTEMS

FIELD OF THE INVENTION

The invention describes a photocatalytic reactor system that is designed to efficiently carry out chemical transformations of a single chemical or multiple chemicals in a fluid. The reactor system utilizes a fluidized bed and non-imaging optics to uniformly and efficiently couple light into a photocatalytic composite material. These improvements greatly enhance the number of chemical transformations per incident photon performed while decreasing energy consumption and extending photocatalyst life.

CROSS REFERENCE TO RELATED APPLICATIONS

This application is a Continuation in Part U.S. Utility application taking priority from U.S. Provisional application No. 62/883,286, filed Aug. 6, 2019, U.S. Provisional application No. 62/760,428, filed Nov. 13, 2018, U.S. Provisional application No. 62/595,261, filed Dec. 6, 2017, U.S. Provisional application No. 62/5644,08, filed Sep. 28, 2017, U.S. Utility application Ser. No. 16/680,495, filed Nov. 12, 2019, U.S. Utility application Ser. No. 16/212,663, filed Dec. 6, 2018, U.S. Utility application Ser. No. 16/147,536, filed Sep. 28, 2018, all herein incorporated by reference.

REFERENCES

Background

Photocatalysis is a process that uses light to create electrons and holes in a semiconductor ("photocatalyst"), which then interact with surface groups to form reactive oxygen species (ROS), such as OH· and O2-·. These ROS can be used to transform or degrade organic species, eventually producing $CO_2$ and $H_2O$ in a process called mineralization if reactions are allowed to proceed to completion. This process may be used for fluid purification. Alternatively, ROS are used in the reaction of organic species to create high-value products. Photocatalysis is also used to transform $CO_2$ to methanol or methane.

Photocatalytic reactions require efficient mass transfer of the chemical species to be transformed, often organic, to and from the active sites of the photocatalyst and optimal light utilization to ensure the photoactive sites are sufficiently reactive to convert the chemical species. To achieve optimal performance, both the photocatalyst and the reactor should be matched, i.e. designed as a system, such that mass transfer and light utilization are maximized within the system. A variety of reactor systems have been developed, including annular, fixed bed, monolithic, flat plate, and slurry. However, in most of these systems, the photocatalyst is a powder and is stationary, and the fluid containing the chemical species simply passes over this non-moving phase. These configurations lead to a high burden of organics on the photocatalyst at the inlet, where the concentration of the chemical to be transformed is in much higher concentration. With these approaches, it is also difficult to regenerate the photocatalyst without shutting down the entire system. Some systems, such as flat plate, suffer from poor mass transfer of the target species out of the fluid stream and onto the photoactive site, as channels are created that allow the chemical species to pass the photocatalyst without interacting with it. There are some reactors that have high mass transfer and illumination efficiency such as rotating disk reactor and microchannel reactors, but scalability of these systems remains an issue, and they have only been used for liquid systems.

One way to reduce the inlet burden of the chemical species on the photocatalyst and to more efficiently couple light into the reactor is to fluidize the photocatalyst so that the photocatalyst moves throughout the bed at a bed density through which light can travel to the interior of the reactor. Here a fluidized bed refers to a system in which the photocatalyst particles move inside the reactor from the momentum of the fluid or by agitation to the system by an external agitation source. This approach has the added benefit of increased mass transfer of the chemical species from the fluid to the photocatalyst. In addition, the effective density of the photocatalyst bed is reduced to allow for more uniform light exposure and penetration depth of the light into the reactor, increasing the turnover frequency of the desired chemical transformation.

Despite the benefits of fluidized bed photoreactors, most photocatalytic reactors are based on fixed or rotating bed type designs with only a few, non-commercial fluidized bed systems proposed to date. One challenge is the poor fluidization behavior of many photocatalysts, such as $TiO_2$, which are often in the form of a powder. These powders are classified as Geldalt Type C, and they are poorly fluidized because of intermolecular forces that cause them to coalesce, leading to fluid channeling and poor light utilization. Improved fluidization of the photocatalyst has been accomplished by attaching it to carrier particles, such as those made from silica and alumina. While fluidization is improved with these materials, the attrition of these hybrid particles, (i.e., the loss of material during fluidization because of collisions with other particles and the sides of the reactor often creating fine particles) is often not reported. Although the support may itself be resistant to attrition, the weak bonding between the photocatalyst coating and support (i.e. physical or electrostatic) seems highly susceptible to attrition. Improving bond strength by high temperature sintering is not desirable because it may denature the active photocatalyst. In other cases, larger photocatalyst aggregates are used; however, they are highly absorbing of incident light, limiting the amount of photocatalyst that can be effectively utilized to only the outer layers.

Also problematic is the wear on the reactor walls from continued impact with the photocatalyst which are often made of quartz or glass.bb. For systems where the light is placed internal to the reactor, the photocatalyst may abrade the light source or outer coating of the light source, and in the case of gas discharge lamps, it may cause holes to develop in the lamp that allow the gas to leak, causing catastrophic and potentially hazardous failure. Although the problem is acknowledged, there are no solutions that prevent this problem while simultaneously improving light transmission through the lamp housing, window, or light guide, any of which may be used to provide illumination of the photocatalyst.

In addition to the attrition of traditional photocatalysts, the interaction of light with the photocatalyst on a systems level is not well described for fluidized beds. Many groups have looked at light-system interactions for other types of reactors such as fixed bed, optical fiber, flat plate, and rotating disk, but little has been investigated for fluidized bed reactors. Some work has been performed on modelling the initial radiant transfer form the light source, but does not cover the complex light, matter interactions resulting from reflection, absorption, and scattering of the photocatalyst and reactor. In fluidized beds, the photocatalysts can scatter a large fraction of incident light, causing it to interact with an adjacent particle or bounce out of the reaction zone as wasted radiation. Some have looked at methods to optimize the optical properties of the support and photocatalyst coating for fixed beds, but critical dimensions have not previously been investigated for fluidized systems. Reactor design has not emphasized uniform, deep penetration of light in fluidized systems, which is required for effective designs going forward and to achieve scalable systems that can minimize geometric and energy footprints.

It would be a significant improvement to the efficient use of photocatalytic fluidized bed reactor systems to pull together these valuable concepts in a design that uses low-attrition photocatalysts that have improved interaction with illuminating light and the fluid of interest. These improvements involve reducing deleterious wear of the light transmitting elements, developing novel illumination schemes, and incorporating antireflective coatings.

The subject invention may be embodied in the following examples that are by no means restrictive but are intended to illustrate the invention. It will be clear that the described invention is well adapted to address the issues described above, as well as those inherent within. The citation of any publication is for its disclosure prior to the filing date and should not be construed as an admission that the present invention is not entitled to antedate such publication by virtue of prior invention. Numerous other changes may be made which will readily suggest themselves to those skilled in the art and which are encompassed both in the spirit of the disclosure above and the appended claims.

SUMMARY OF THE INVENTION

The present disclosure relates to a photocatalytic fluidized bed reactor system ("photoreactor") for efficiently integrating light into the photocatalyst and throughout the cross section of the reactor. The disclosure also relates to photoreactor designs principles (below) that utilize low-attrition, high-surface-area photocatalysts that fluidize efficiently under operating conditions. It also relates to reactor designs that are modified to reduce photocatalyst damage to transmissive or reflective surfaces necessary for light introduction to improve the illumination, which directly increases desired conversion of chemical species. It also relates to regeneration operational schemes and hardware to increase photocatalyst lifetime and extend operation between shutdown cycles.

There are aspects of the photoreactor design that are enabled by use of the monolithic composite photocatalyst, that provide, either in part or preferably in combination, maximum transfer of optical illumination to the photocatalyst:

a. Geometric & optical coatings non-imaging optics that maximize the optical power amplitude and uniformity delivered to the photocatalyst bed.

b. Use of monolithic composite photocatalyst elements (e.g. monolithic photocatalyst spheres) to comprise the photocatalyst bed. These elements have multiple functions: to support the photoactive nanomaterials, to provide high surface area for adsorption of the target species prior to mineralization, to provide a fluidizable medium with low attrition, and to provide an integral part of non-imaging optics of the photoreactor.

c. Engineered control of optical scattering and absorption of the photocatalyst bed, via photocatalyst element size, choice of photocatalytic illumination wavelength and material modifications to achieve various absorption values at particular wavelength.

d. Exploiting fluidization driven migration of photocatalyst elements through internal regions in the photoreactor, to periodically achieve higher optical intensity, and higher time-averaged optical intensity incident on a photocatalyst element

DETAILED DESCRIPTION OF THE INVENTION, AND PREFERRED EMBODIMENTS THEREOF

Figure 1:
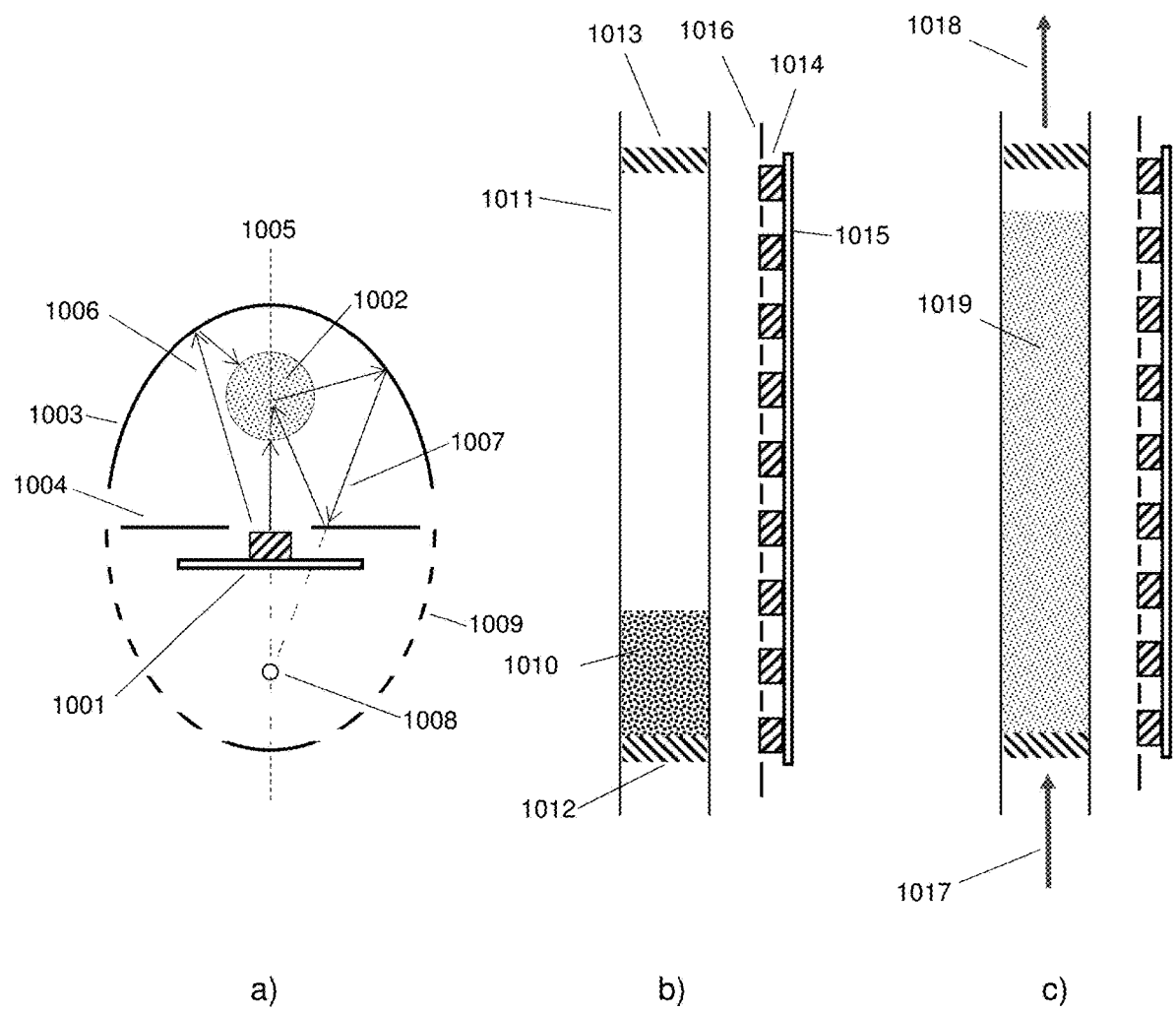
FIG. 1 is a schematic of a cylindrical photocatalytic reactor system with fluid flow in an axial direction and illumination generally in a radial direction and inward toward the axis using a combination of elliptical trough and planar reflectors
Figure 1:
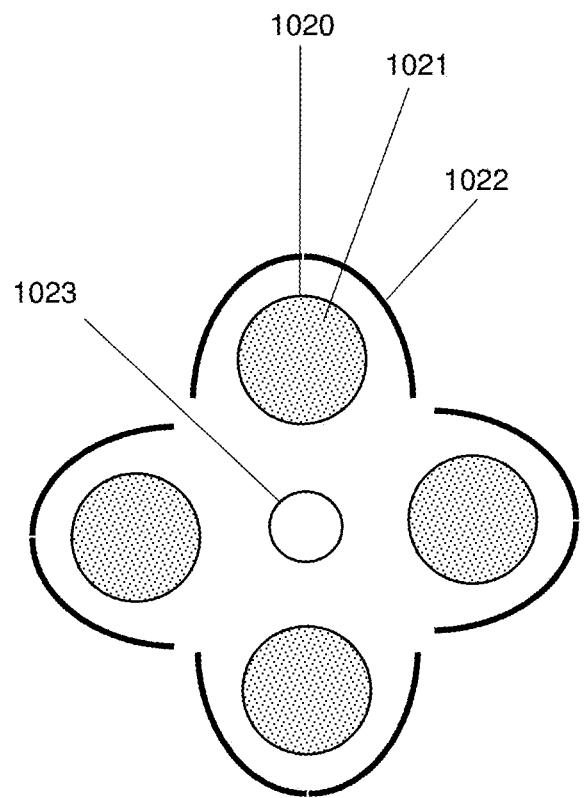

The general invention described herein refers to a photocatalytic reactor system ("photoreactor") that is comprised of a photocatalyst that may be fluidized ("fluidizable photocatalyst"), and a photoreactor that contains the photocatalyst. The photocatalyst has low attrition (less than 3 wt %/h per ASTM D5757) and high-surface-area (50-600 $m^2/g$ $N_2$ BET (Brunauer, Emmett and Teller) surface area collected at 77 K).

The photoreactor attributes preferably include: 1) an illumination source or sources with intensity that can be controlled, coupled to heat sink or other cooling means to remove waste heat, 2) non-imaging optical components to maximize the illumination intensity incident on the photocatalyst, 3) a reaction chamber that confines the fluidizable photocatalyst material inside a reaction zone ("containment vessel"), 4) a means for photocatalyst fluidization, 5) fluid flow through the reactor that contains a chemical or chemicals to be transformed, and 6) an electronic control system to operate the various components.

The photoreactor may incorporate elements that help improve the rate of chemical transformations such as optics, photocatalyst heating and heat sources, reflectors, regeneration zones, and coatings.

As used herein and in the appended claims, the reaction zone refers to the area where the light, fluid that contains the chemical or chemicals to be transformed, and photocatalyst interact to cause a chemical transformation.

As used herein and in the appended claims, the regeneration zone refers to the area where the photocatalyst properties are modified so as to return to at least 50% of their chemical reactivity properties, (i.e., to perform a chemical transformation) by partially or completely reversing the effects of adsorbed by-products caused by performing the chemical transformation.

As used herein and in the appended claims, the illumination source refers to any apparatus that emits light of the wavelength necessary to activate the photocatalyst. The light source or sources may include but are not limited to: light-emitting diodes (LEDs), laser diodes, low or medium pressure mercury lamps, Xe-discharge lamps, and excimer lasers. Illumination sources may optionally provide light that has utility to regenerate the photocatalyst, e.g. UVC radiation, and/or to heat the photocatalyst in order to regenerate the photocatalyst or to increase chemical transformation rates.

As used herein and in the appended claims, chemical transformation refers to the oxidation, reduction, or substitution reaction or reactions performed on an organic molecule or multiple organic molecules containing any combination of C, H, N, O, S, P, Si, or halide using reactive oxygen species generated by the interaction of the photocatalyst with the illumination source. The result of this chemical transformation can be a high-value product desirable to the chemical industry, including alcohols, ketones, aldehydes, carboxylic acids, and epoxides. These high-value products can be the final commercial product of a chemical synthesis or serve as a feedstock for further chemical transformations.

As used herein and in the appended claims, mineralization of an organic species refers to conversion of said organic species or volatile organic chemical (VOC) to $CO_2$ and $H_2O$. Mineralization of an organic species or VOC containing nitrogen, sulfur, halides, and the like will also generate, in addition to $CO_2$ and $H_2O$, small molecule compounds (e.g., mineral acids) related to these functional moieties.

As used herein and in the appended claims, a fluid refers to a gas, liquid, or any combination of gas and liquid.

As used herein and in the appended claims, fluidizable or fluidizable photocatalyst refers to a solid within a fluid flow whose downward force due to gravity is overcome by the drag force applied by an upward flowing fluid causing the solid to move.

As used herein and in the appended claims, a fluidized bed refers to a system where the photocatalyst inside the reaction zone is mobilized by the fluid passing through the photocatalyst or by an external agitator such as vibration or rotation.

As used herein and in the appended claims, composite photocatalyst refers to a mixture of the photoactive catalyst and a non-photoactive material or materials.

As used herein and in the appended claims, bed density refers to the density of solids within the volume of the reaction zone.

As used herein and in the appended claims, voidage refers to the fraction of the reaction zone that is not occupied by solids As used herein non-imaging optics refers to an ensemble of transmissive, scattering or reflective optical elements and materials that maximize the fraction of illumination that is incident on the photocatalyst and the uniformity of such illumination. In a preferred embodiment, the photocatalyst bed is itself an element in the photoreactor non-imaging optical system and properties of photocatalyst diffuse reflectance (i.e. scatter) and absorption are tailored to optimize performance. Other particles that do not contain the photocatalyst but are contained in the reactor and are transparent or reflective can also be part of the optical system whose concentration, size, transparency, and reflectivity can be tailored to optimize performance. Other surfaces of the containment vessel may possess high external transmittance via the use of antireflection coatings. These highly reflective or transmissive surface coatings may be comprised of high hardness materials that reduce the abrasion due to the fluidized photocatalyst during use.

As used herein photocatalyst heating and heat sources may include 1) fluid preheating upstream of the reactor inlet, including by re-use of illumination source cooling gas, 2) wall heating using for example, electrical resistance or gas fired means, 3) heat introduced onto the photocatalyst by non-imaging optical components via illumination source or sources, for example infrared radiation.

Photocatalytic Reactor Systems

Photocatalytic reactor systems have several common attributes:

1) the photocatalyst material
2) Photoreactor design
   a. Containment vessel, which confines the photocatalyst, while allowing fluid flow through and over it, and photocatalytic illumination incident on it.
   b. Fluid flow direction and flow rate, referring to the fluid to be purified or chemically modified, through and over the surfaces of the photocatalyst
   c. Photocatalytic illumination spectral irradiancy and direction with respect to the photocatalyst and fluid flow directions.

In order to optimize efficiency of the intended chemical transformation and to minimize energy consumption, the photocatalyst in a photocatalytic reactor must be uniformly illuminated with adequate intensity photocatalytic illumination (i.e. intensity variation <25% of the average intensity in the photocatalyst), and the fluid to be reacted must be exposed to the photocatalyst. In a preferred embodiment of the subject innovation, the fluid is a gas, although the design principles herein may also be applied to liquid reacting systems. Hence the detailed reactor geometry, including illumination geometry and flow dynamics, are crucial design elements.

The photoreactor containment vessel is a component of the photoreactor optical system since illumination interacts with these materials and surfaces for delivering photocatalytic illumination. In this case the transparent tube transmits illumination. Maximizing delivery of optical power to the photocatalyst is a key attribute of photoreactors, and several principles of non-imaging optics may be incorporated to achieve that objective. Non-imaging optical systems employ transmissive, reflective and scattering components, including coatings on those elements, to maximize radiative power transfer from an energy source to a location to usefully employ that energy. They are differentiated from imaging optical systems in that they are not concerned with creating an image. Use of non-imaging optical systems in photocatalytic reactor systems is a significant aspect of the subject innovations and will be described below.

There are several basic photoreactor geometries that may be employed, each with its own unique combination of these three attributes (a-c). The subject innovations in these areas may in general be applied to many photoreactor designs, including designs that are not specifically described herein. Three of the most relevant are denoted as Type 1, Type 2, and Type 3, and are summarized in Table 1.

The photocatalyst is confined in a section of the chamber by one or more gas permeable containment elements, which may be porous frits, screens, perforated discs or other similar elements that do not let the photocatalyst pass, but which allow fluid flow through them. This element is positioned directly below the photocatalyst to counteract the force of gravity. Additional confining elements can be downstream of the photocatalyst but can also include particle separators such as a cyclone. The reaction chamber can also contain non-catalytic particles that help transmit or reflect light.

The reactor in this invention is typically oriented vertically, and fluid flow is upward through the bed, opposite the

TABLE 1

Comparison of different photocatalytic reactor configurations

| Reactor Type Description | Type 1<br>Cylindrical cell | Type 2<br>Cylindrical, annular fluid flow | Type 3<br>Non-imaging optical cell |
|---|---|---|---|
| Geometry | Transparent cylindrical cell, axial fluid flow through a packed or fluidized photocatalyst bed | Axial fluid flow through an annular region that contains a packed or fluidized photocatalyst bed | Fluid flow is axial with respect to a non-imaging cell with interior reflective walls. Illumination is predominantly axial and perpendicular to the top surface of a packed or fluidized photocatalyst bed. |
| Illumination source | External linear illumination source or sources that are configured parallel to cylindrical & fluid flow axis. Linear source may be an LED array, a linear discharge source such as a xenon lamp, or a cylindrical lightguide with engineered leakage along the length of the lightguide. An array may be comprised of a hybrid combination of sources with different spectral output. | Linear illumination source in a transparent cylindrical cell, Linear source may be an LED array, a linear discharge source such as a xenon lamp, or a cylindrical lightguide with engineered leakage along the length of the lightguide. An array may be comprised of a hybrid combination of sources with different spectral output. | High intensity/point source or compact array and internal reflectors. An array may be comprised of a hybrid combination of sources with different spectral output. |
| Photocatalytic illumination geometry | Primary illumination is inwardly radial toward axis. Secondary illumination is also predominantly inwardly radial, after reflection from external reflectors. | Primary illumination is outwardly radial from axis. Secondary illumination (from exterior cylindrical reflector) is inwardly radial | Primary illumination is axial onto top surface of catalyst bed. Secondary illumination, reflected from high reflective cell interior walls, has axial and radial components |

Type 1

A single cylindrical reactor chamber that has walls that are transparent or translucent for the desired photocatalytic illumination wavelengths. A fluidized or packed photocatalyst bed is contained in the reactor interior region. Fluid flow (for the material to be purified of chemically reacted) is in a generally axial direction.

The simplest case is a single cylindrical vessel, i.e. the containment vessel cross section is circular. In addition to cylinders, other vessel geometries may be advantageous for uniform illumination, achieved via multisided cross sections such as triangles, rectangles, hexagons, etc. The corners of the multisided cross sections may have radii that improve fluidization and circulation of the particles. A radius greater than or equal to the particle is desired, and particle sizes may vary from 10-1000 microns. The cross section may also be an oval shape with a ratio of major to minor radius of >1. More preferably, the ratio of major to minor axis is >1.5.

force of gravity. Fluid flow will mechanically agitate the photocatalyst, which will then occupy larger volumes of the reactor. For example, at rest or below the minimum fluidization velocity, the reaction zone may have a voidage of at least 0.3 meaning 70% of the reaction zone is occupied by "stationary" solid particles. In a preferable embodiment of the invention, the reaction zone has a static voidage of 0.36 or greater. Adding fluid flow greater than the minimum fluidization velocity will cause the bed to expand increasing the voidage and also increasing the size of the reaction zone. For high flows the dispersed (fluidized) photocatalyst may occupy all the reactor volume. For the fluidized bed reactor of this invention the voidage is typically 0.6-0.8. It is also possible to entrain the photocatalyst in the fluid flow so that it is carried out of the reactor and separated from the fluid. Entrained particles can be circulated back into the reactor and may be regenerated while outside the reaction chamber. Voidage in the reactor of this invention can be controlled at values greater than 0.8 by controlling the fluid flow rate. For the photocatalytic reactor of this embodiment, the voidage should be greater than 0.4, but more preferably greater than 0.6 to ensure uniform deep light penetration.

Photocatalytic illumination is provided through the transparent or translucent walls from light sources that are preferably linear and positioned parallel to the cylinder axis. Multiple linear sources may be employed to improve the uniformity of illumination throughout the photocatalyst bed. Non imaging cylindrical trough reflectors may also increase efficiency to deliver illumination into the catalyst. These external reflectors may serve to collect lamp radiation that is directly incident on the photocatalyst ("primary illumination") or to collect and redirect illumination that is scattered from the photocatalyst ("secondary illumination"). The light source is preferably placed as close to the reaction chamber as possible since optical radiation decreases exponentially with distance. Individual emitters on the linear sources should have wide viewing angles)(>120° in order to more uniformly illuminate the reactor while also allowing light emitted outside of the reactor viewing angle to travel to reflectors around the reactor and be redirected by the non-imaging optics to the sides opposite the light source.

When the photocatalyst is fluidized, light penetration is increased and the photocatalyst will be more uniformly illuminated, thus increasing the efficiency of photocatalytically driven chemical reactions. This increased light penetration due to fluidization may still not sufficiently allow light to penetrate all regions in the bed volume. Additional scattering and transparent particles within the reactor volume may be used to aid light penetration into the reactor. Fluidization also has the effect of exchanging the photocatalyst through the bed volume, so that all of the photocatalyst will be illuminated to some extent.

The containment element at the reactor volume inlet will establish gas flow characteristics in the photocatalyst bed. The simplest elements result in inlet gas flow in a predominantly axial direction relative to the vessel. It may be advantageous to establish gas flow with radial or azimuthal components to increase the migration rates of the photocatalyst in the fluidized bed, thereby improving illumination uniformity and fluid interaction with the catalyst.

Improved flow dynamics may also be achieved via use of a mixing element, which ideally will be optically transparent or translucent for the photocatalytic illumination wavelengths. The mixing element may be any variety of static mixer or gas distributer designs or other plates, fins or rods.

FIG. 1 is a schematic of this Type 1 photoreactor. FIG. 1a is an end view that shows a preferred embodiment, with a linear array of 365 nm LEDs 1001 and the photocatalyst contained in a transparent cylindrical tube 1002.

The tube materials 1002 of construction are preferably glass or fused silica, although other transparent materials may be employed as well, including alumina or polycarbonate for example. The preferred embodiment is for the tube to be optically transparent at the illumination wavelength, i.e., with internal transmittance greater than 99%. Reflection losses may be reduced by use of antireflection coatings on both the internal and external surfaces. In that case external transmittance of the photocatalytic illumination may be greater than 98%. Antireflection coatings can increase the photocatalytic illumination incident on the photocatalyst by approximately 6%.

Photocatalytic illumination is generated by a linear light source 1001 on a high thermal conductance copper based PCB board that is mounted on a heat sink on the rear surface (not shown).

Illumination from the source is directly incident on the photocatalyst 1002, reflected from the reflector 1003, and in the case of outwardly scattered (non-absorbed) illumination, is redirected back to the photocatalyst 1006.

These are surrounded by two reflectors, an elliptical trough reflector 1003 and a planar reflector 1004. The planar reflector 1004 has openings provided such that the outer LED emitting surfaces near the plane of the planar reflector 1004, which is configured parallel to the ellipse minor axis and at or near the minor axis i.e. less than 10% of the major axis away from the minor axis. Both reflectors 1003 and 1004 have reflectance approximately 90% a 365 nm. The linear LED array 1001, photocatalyst tube 1002, elliptical reflector 1003 and planar reflector 1004 are configured symmetrically with respect to the ellipse major axis 1005.

The reflectors may be constructed of simple aluminized metal, which may be electroformed for example. The aluminum coating may be highly specular, with reflectivity approximately 92%, or enhanced with dielectric layers to achieve reflectivity greater than 99% at the illumination wavelength. The cross-sectional shape of the reflector may be circular, parabolic, or a non-conic section shape that is optimized to maximize the transfer of energy from the illumination sources to the photocatalyst. The light source configuration and directional characteristics, and the on-imaging optical components will be adjusted to uniformly redirect scattered light back onto the photocatalyst. This reflector geometry is a preferred embodiment and the subject invention includes perturbations of these shapes and dimensions.

Reflectors in these photoreactor applications may optionally incorporate transparent substrates, with high reflectivity achieved by all-dielectric interference coatings. Particularly useful coatings include dichroic characteristics to achieve high reflectivity at the design wavelength and moderate to high transmission at infrared wavelengths. These reflector designs would address illumination sources that emit at a range of wavelengths that are undesirable and contain a lot of energy, e.g., for medium- and high-pressure mercury lamps, xenon lamps, etc.

The elliptical trough reflector 1003 serves to reflect illumination that is not directly incident on the photocatalyst 1002 and reflect those light rays 1006 back onto the photocatalyst tube. Illumination from such other directions is useful to improve illumination intensity and intensity uniformity in the tube 1002.

Light incident on the photocatalyst scatters in a range of directions and the elliptical trough and planar reflector work in concert to redirect that light bac to the photocatalyst 1007. The planar reflector near the elliptical minor axis provides a virtual reflector 1009 with the virtual second ellipse focus at 1008. Because the photocatalyst 1002 is also located near the other ellipse focus, scattered light 1007 from the photocatalyst tube 1002 may be redirected to the photocatalyst tube with two reflections, with energy loss less than 20% for reflectors with greater than 90% reflectance a the illumination wavelength.

Optical reflectance of the photocatalyst, also described as diffuse reflectance or scatter, may be modified to optimize the illumination intensity and intensity uniformity incident on the photocatalyst. This optimization is typically done in an optical design ray tracing program such as Zemax. In such optical models all or many of the design parameters of the non-imaging optical system may be varied and the photocatalyst intensity in the photocatalyst may be maximized. These are the optical design parameters that may be varied for the subject Type 1 photoreactor: photocatalyst tube 1002 dimensions, photocatalyst reflectance (and associated absorbance) at the photocatalytic illumination wavelength, LED linear 1001 array spacing and distance from the photocatalyst tube, tube envelope external transmittance that is determined by tube material and the reflection of the interior and exterior surfaces (i.e. determined by the presence of antireflection coatings), the spacing and curvature of the elliptical reflector 1003 and spacing of the planar reflector 1004. The exact curvature of the trough reflector and planar reflector may be perturbed from those ideal shapes. These optical system parameters including the photocatalyst reflectance can distribute the reflected power between various reflection geometries such as those indicated as 1006 and 1007 to achieve optimized illumination intensity and intensity uniformity.

FIG. 1b shows a side view of the Type 1 design, with no gas flowing. The photocatalyst 1010 is in the transparent containment vessel 1011. In this schematic, it is evident that the photocatalyst occupies about ¼ of the containment volume under this no-flow condition. This view shows gas conductive containment elements at the inlet (bottom) 1012 and at the top 1013. In this case those elements are metal screens with openings of 30 microns size, which confine the low attrition photocatalyst which are spherical and are 70 microns in diameter. The illumination source is a linear LED array 1014 on a PCB board 1015, with an integral planar reflector 1016. In this view the elliptical trough reflector is not shown. Also not shown are the LED array power supply, inlet fluid blower and plumbing, and the LED heat sink that is attached on the LED housing.

FIG. 1c provides the same side view as FIG. 1b, except gas is flowing (forcibly introduced) at the inlet (bottom) of the vessel 1017 and out the outlet (top) 1018. The gas passes through the photocatalyst 1019 and exits the photoreactor at the outlet (top). In this case the catalyst is fluidized, and the volume increases to most of the volume in the containment vessel. This reduced photocatalyst bed density is a key method to enable greater penetration of photocatalytic illumination through the bed, and the fluidization also provides rapid circulation of the photocatalyst both top to bottom and center to edge. These factors and the optical reflectors and antireflection coated elements contribute to a highly uniform illumination of all the photocatalyst. The low-attrition photocatalyst of the subject innovation is a key enabling technology for fluidization of this type. It prevents premature decomposition of the catalyst, which would increase operating costs due to downtime and material replacement, and costs to address accumulation of attritted material beyond the downstream confinement element.

In another embodiment, a plurality of reactors with the types of reflectors described above may be disposed around a central light source. A top down view is shown in FIG. 1d, where the transparent reactor tube 1017 containing the photocatalyst 1018 and associated reflector 1019 are in axial alignment with a center light source 1020. The central light source may be LEDs arranged along the axial direction of the reactors or it may be a single source such as a low or medium pressure mercury lamp. The number of reactor/reflector assemblies may vary from 2 to 20; four reactor/reflector assemblies are shown in FIG. 1d.

Type 2 A single annular cylindrical reactor chamber (i.e., defined be the volume between two coaxial cylinders) in which the inner cylinder walls are transparent or translucent for the desired photocatalytic illumination wavelengths, and the outer cylinder is reflective for the desired photocatalytic illumination wavelengths. In this case reflectance would be greater than 50%, or preferably greater than 80%, and most preferably greater than 95% for the wavelengths of interest. In a preferred embodiment, photocatalyst reflectance is between 40% and 95%. A fluidized or packed photocatalyst bed is contained in the annular region. Reflectance at this interior surface of the external cylinder may be determined by the intrinsic properties of the cylinder material of construction, e.g., aluminum should have reflectance >80%, and polished aluminum greater than 90%, both over a broad band of wavelengths from UV-C though the visible.

Fluid flow (for the material to be purified or chemically reacted) is in a generally axial direction through the photocatalyst bed that is defined by the annular region and the containment elements that were described above. As in Type 1 the inlet may be designed to introduce azimuthal and radial flow components to advantageously increase fluid interaction with the photocatalyst and illumination uniformity on the photocatalyst.

In Type 2 the illumination source is in the central cylinder, and light is directed predominantly radially outward and incident on the photocatalyst bed. This central illumination source may be a linear array of point sources, such as an LED chip-on-board array, or a linear discharge source, such as a low- or medium-pressure mercury discharge lamp or a Xe-discharge lamp. In one embodiment the LED board may have a reflective coating to redirect backscattered illumination back onto the photocatalyst. The central source may also be a lightguide that is illuminated at one or both ends of a transmissive solid cylinder and is engineered to "leak" illumination along its length in a controlled manner.

Figure 2:
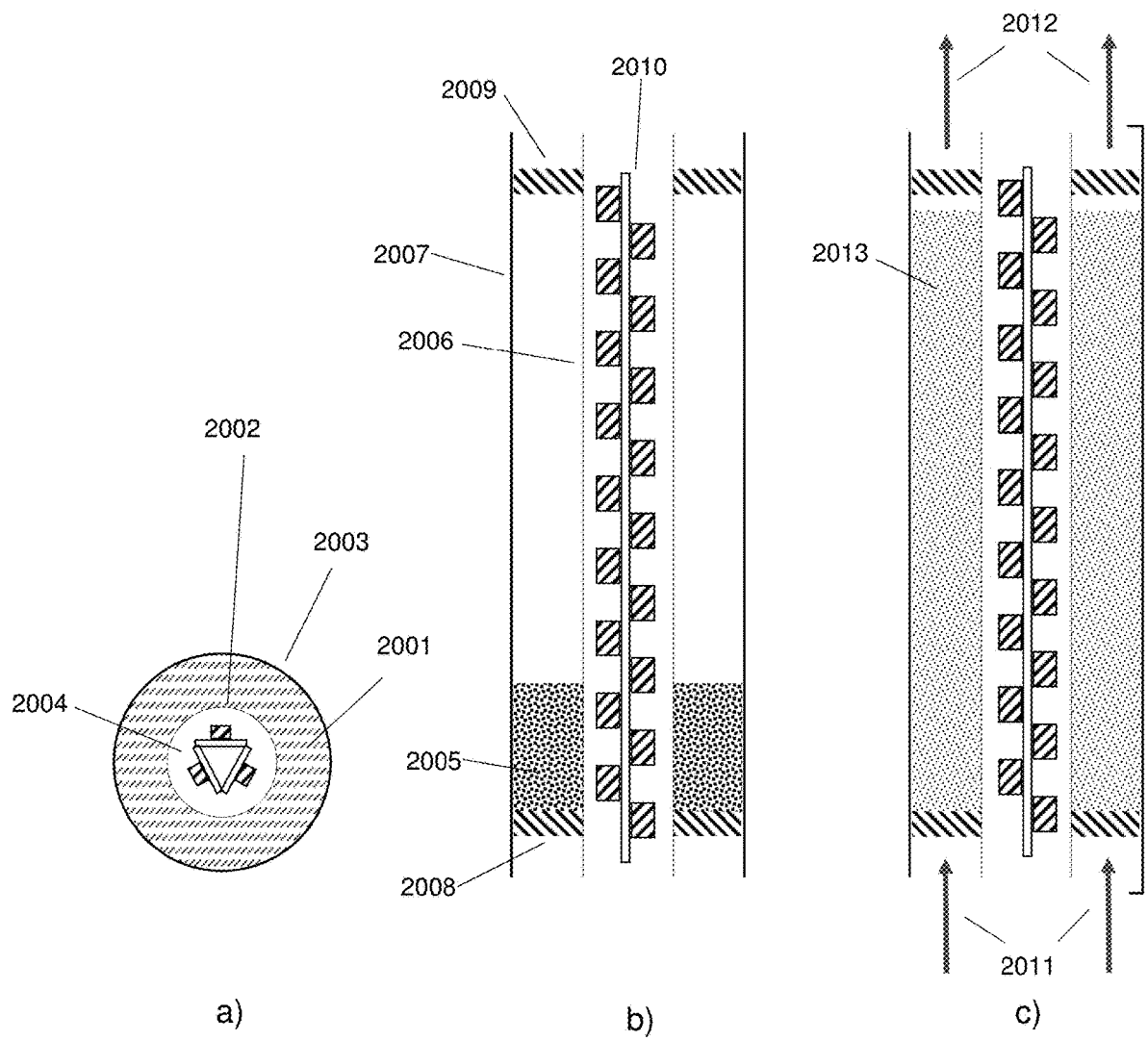
FIG. 2 is a schematic of a photocatalytic reactor system with coaxial cylindrical walls, with fluid flow in an axial direction through the resulting annual region and illumination from an illumination source inner cylinder, and generally in a radial direction and outward from the axis.

FIG. 2 provides a schematic of the Type 2 photoreactor. FIG. 2a is a cross-section of this reactor that is comprised of two coaxial cylinders, with the annular region containing the photocatalyst 2001. The inner cylinder 2002 is a transparent envelope for separation of the centrally configured linear illumination elements 2004. Like FIG. 1, its surfaces are preferably coated with an antireflection coating on the surface not in contact with the photocatalyst, which for Type 2 is the inner surface. The outer surface of the inner cylinder may be coated with a hard anti-wear coating, such as aluminum oxide or diamond like carbon (DLC) in order to reduce its wear while in contact with the fluidized bed constituents. A high durability antireflection coating may optionally be fabricated on this outer surface of the inner cylinder, with a hard outer surface to prevent wear from the fluidized photocatalyst.

Figure 6:
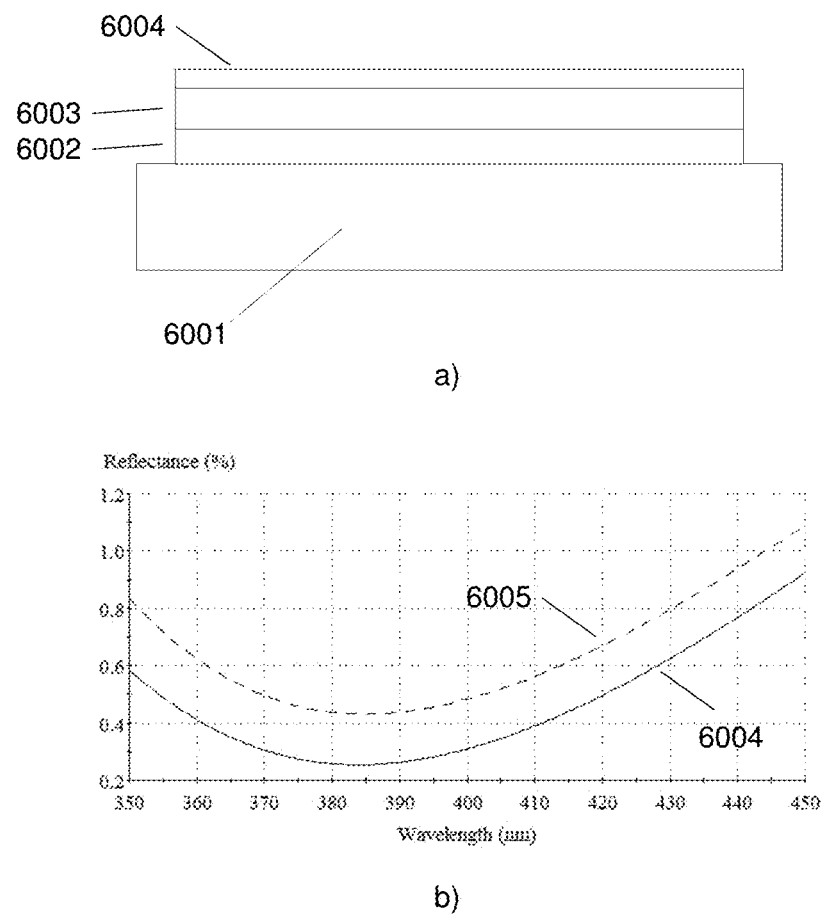
FIG. 6 is a schematic of an antireflection coating and calculated spectral reflectance with and without a DLC top layer.

A high performance design may be achieved with a total of 3 layers, with Rmin of 0.4% at 410 nm. A schematic of the layer design and spectral reflectance is shown in FIG. 6. Such antireflection coatings may be optimized for the appropriate photocatalytic illumination wavelength. That is compared with the normal single surface Fresnel reflectance of 4.2% for borosilicate glass.

The outer cylinder 2003 provides a reflector on its inner surface to redirect illumination back inwardly towards the photocatalyst. It may be an aluminum housing with a polished interior surface, optionally with pairs of dielectric high index low index layers, to boost reflectance at the chosen design wavelength above 95%. Aluminum construction has the added advantage of high thermal conductance, which benefits high transfer out of the photoreactor to heat sinks. These heat sinks may be either passively cooled via convection in air or other fluids or actively cooled. A combination of passive cooling and active heating on this external cylindrical element can be implemented and would allow operation of the photoreactor at higher temperatures, e.g., up to 140° C.

In addition to a metallic or dielectric-enhanced metallic reflector, an all-dielectric high reflector may be fabricated as described above. Extremely high durability at the inner surface 2004 may be achieved by forming a hard coating on the interior, such as alumina or DLC, and forming a high reflective metallic or dielectric metal structure on the external surface.

FIG. 2b shows a side view of the Type 2 design, with no gas flowing. The photocatalyst 2005 is in the annular region between the interior cylinder 2006 and the outer reflector cylinder 2007. It is evident that the photocatalyst occupies about ¼ of the containment volume under this no flow condition in this schematic. This view shows gas conductive containment elements at the annular inlet at the reactor bottom 2008, and at the annular outlet (top) 2009. The linear LED array 2010 is centrally located as shown.

This central illumination source or sources 2004 are segregated from the photocatalyst and may preferably be equipped with a means of cooling such as forced air flow past finned heat sinks on the LED chip on board liner arrays that are shown. For photoreactor operation at elevated temperatures, system inlet air may be drawn in through the illumination array region for cooling and would thus be preheated for redirection through the photocatalyst bed.

FIG. 2c provides the same side view as FIG. 2b, except gas is flowing (forcibly introduced) through the annular inlet (bottom) of the vessel 2011. The gas passes through the photocatalyst 2013, which under these conditions fills most of the containment vessel volume and exits the photoreactor at the annular outlet (top) 2012. Typically, there will be a macroscopic bed density gradient along the flow path through the photocatalyst, with higher bed densities at the bottom, and lower bed densities toward the top.

Figure 4:
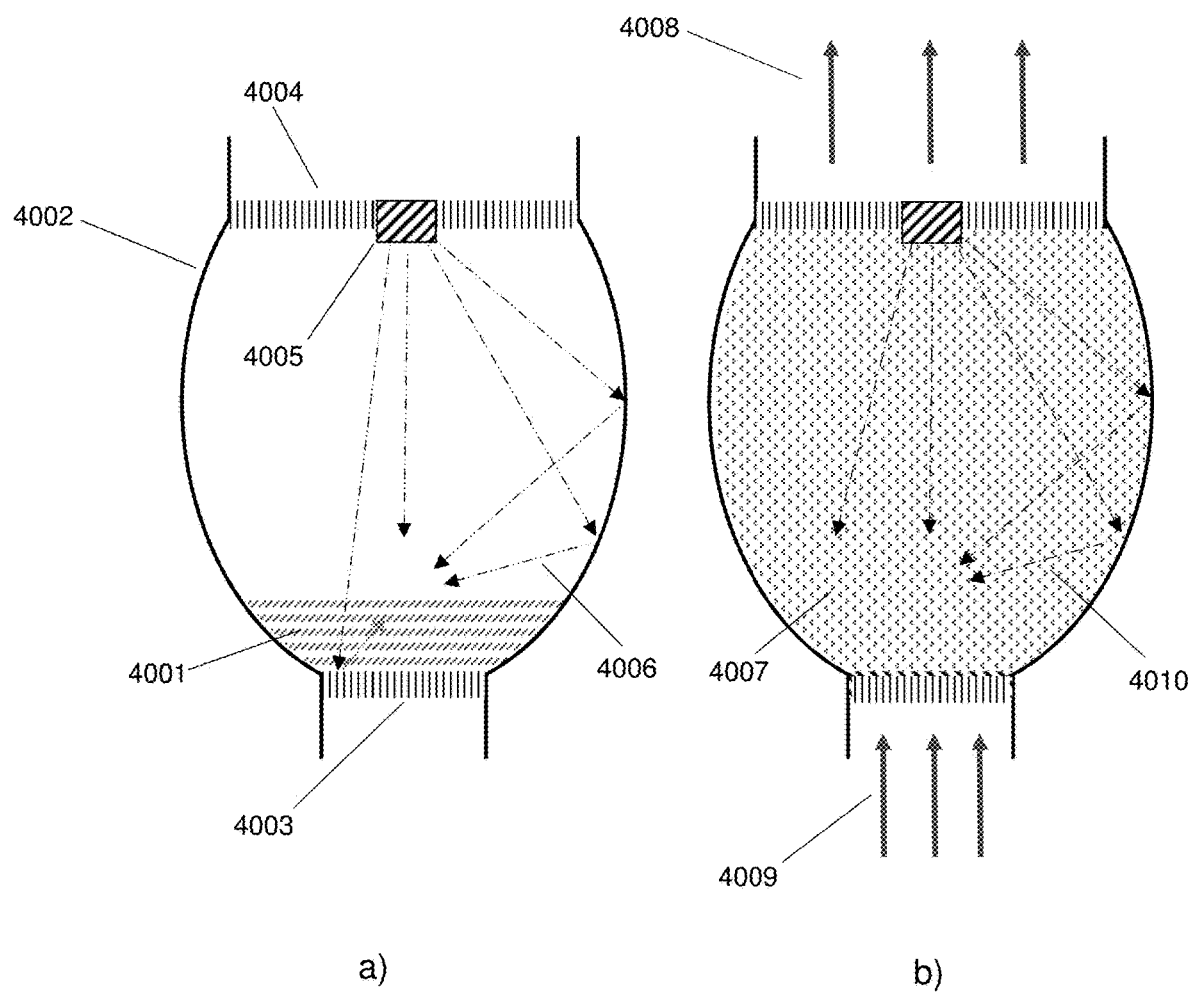
FIG. 4 is a schematic of a photocatalytic reactor system with approximately elliptical walls having high reflectance for photocatalytic illumination, with fluid flow upward in an axial direction and illumination generally downward in an axial direction.
Figure 5:
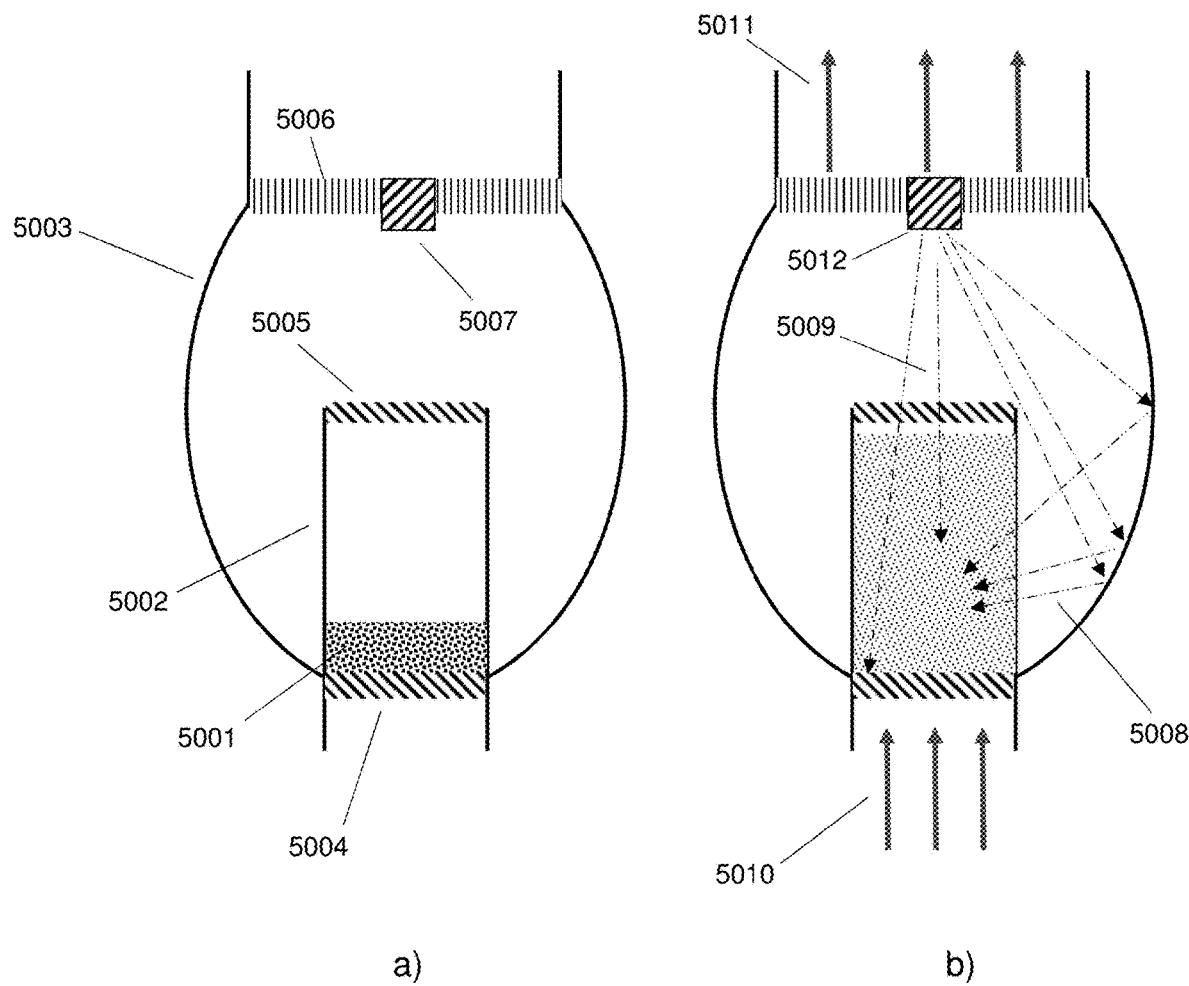
FIG. 5 is a schematic of a photocatalytic reactor system with approximately elliptical walls having high reflectance for photocatalytic illumination, the photocatalyst contained in a coaxial transparent tube therein, with fluid flow upward in an axial direction, and illumination with both axial and radial components.

Type 3 incorporates a non-imaging reflective containment vessel with an illumination directed at a fluidized bed predominantly axial direction, i.e., predominantly aligned with the fluid flow. A primary attribute of this design is the vertical orientation of the reactor cell, and the conical shape that confines the at-rest photocatalyst in a smaller cross section region near the inlet (bottom) of the vessel confinement volume. This principle is illustrated in the FIGS. 3-5.

Figure 3:
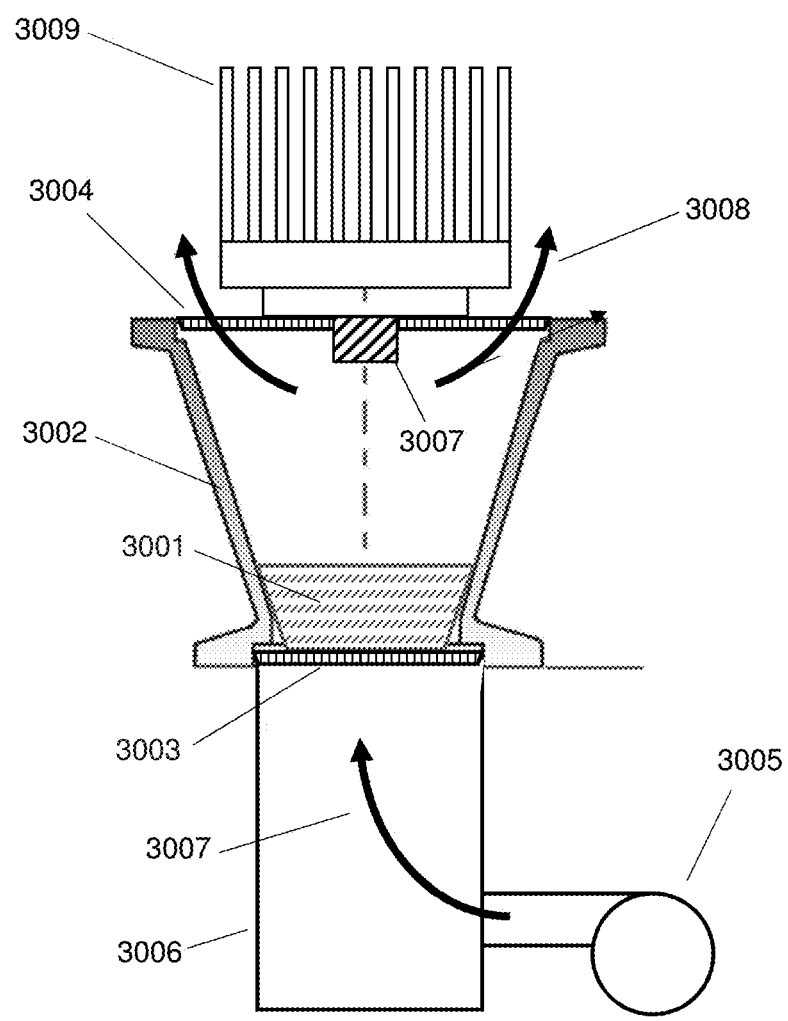
FIG. 3 is a schematic of a photocatalytic reactor system with conical walls and interior surfaces with high reflectance for photocatalytic illumination, with fluid flow upward in an axial direction and illumination generally downward in an axial direction.

FIG. 3 shows a Type 3 photocatalytic reactor system comprised of the photocatalyst 3001 held in a conical cylindrical vessel 3002, with gas permeable confinement elements at the inlet 3003 and the outlet 3004. The conical vessel is metallic, with a polished reflective surface on the interior, with reflectance at the 385 nm illumination wavelength of greater than 95%. Fluid flow 3007 to the inlet confinement element is driven by a blower 3005 and directed to the inlet via the inlet manifold 3006. Illumination incident on the photocatalyst 3001 is predominantly in an axial direction 3010, counter to the predominantly upward gas flow through the photocatalyst. Off-axis illumination 3011 is also directed to the photocatalyst by the reflective interior surfaces.

Fluid flow downstream of the photocatalyst 3008 is directed upward through the outlet confinement element 3004. In this case the illumination source 3007 is an InGaN LED emitting at 385 nm. It is mechanically and thermally coupled to a heat sink 3009. Typical commercially available sources of this type spectral bandwidth of 20 nm FWHM. Multiple LED die (e.g., quantity 9) may be mounted and packaged together on a board that is mounted on a high thermal conductance copper based heat sink in order to dissipate excess energy that powers the emitter. The preferred embodiment is to utilize illumination LED emitters in the 360-420 nm spectral range because of the high reliable and low cost of those sources. Other wavelength LED emitters may also be provided, such as UVC (240-280 nm) to be utilized for periodic catalyst regeneration for example. Alternatively, a broadband illumination source such as a xenon discharge lamp or a medium pressure mercury discharge lamp may be advantageous to provide photocatalyst illumination in the UVA range, as well as significant optical power at longer wavelengths to achieve photocatalyst heating.

There are two means to achieve reactor heating from the photocatalytic illumination sources: longer wavelength emission from discharge sources and thermal waste heat from solid state sources (e.g. LEDs ad laser diodes) have a significant output in longer wavelength radiation. In an example of the former, a typical xenon arc discharge lamp may emit 1.3 W total optical power, of which 1 W (76%) is in the infrared, 700 nm-2800 nm wavelength. Optical power in the UV (200 nm-400 nm wavelength) may be 0.1 W and optical power in the visible (400 nm-700 nm wavelength) at 0.2 W. Use of infrared emission from the UV photocatalytic illumination source is a simple and effective means to achieve moderate heating of the photocatalyst, especially since typical aluminum based reflectors have very good reflectance in the infrared, over 98%.

Solar radiation may also be usefully applied as a photocatalytic illumination sources, as typical spectral irradiancy of the solar spectrum is approximately 900 W/m2 total power, with approximately 10% of that power in the UV (200 nm-400 nm), 40% in the visible (400 nm-700 nm) and 50% in the infrared (700 nm-2800 nm). The UV part of the spectrum is useful for activation of the photocatalyst, and the infrared useful foe reactor heating.

Photocatalytic reactor heating may also be achieved by harvesting the waste heat from LEDs. Neglecting thermal losses in power supplies, InGaN based LEDs emitting in the 365-420 nm wavelength range (such as Osram LZ4 products) have wall-plug efficiencies in the 48-54% range, i.e. 46-52% of the electrical energy provided is dissipated as heat. This heat is removed using forced air cooling of a finned aluminum heat sink or via a forced liquid cooled aluminum or copper block. The coolant may be water or a propylene-water solution. The heat sinks are in intimate contact with the LED PCB back surface, affixed with machine screws and contacted with thermal paste. Either of these cooling fluids may be recirculated past the reactor to achieve heating: heat is removed from the LED array, transported downstream via coolant, and reintroduced to the photoreactor. Glass based photoreactors such as Type 1 or Type 2 are well suited to have forced hot air circulated past them, conveyed by duct work after LED array cooling. Type 3 photoreactors may have the reactor vessel constructed of metal such as aluminum and are well suited for recirculation of liquid coolant.

FIG. 4a shows another Type 3 reactor that illustrates the use of an alternative geometry interiorly reflective containment vessel 4002. Under static (no flow) conditions the photocatalyst 4001 resides at the bottom of the reactor and is partially supported by the inlet containment element 4003. The containment volume is then completely defined by the outlet containment element 4004. In this example the cross-sectional shape of the containment vessel is approximately elliptical, although modifications of that shape may be appropriate to increase illumination power transfer to the photocatalyst. In this case the three-dimensional shape is therefore ellipsoidal or nearly ellipsoidal with azimuthal symmetry around the central axis that corresponds to the predominant direction fluid flow. Other non-conic geometric shapes may also be used advantageously to address non-point sources and the extended nature of a fluidized photocatalyst bed to be illuminated. In cases where the illumination source 4005 is near a focus of the ellipsoid, the elliptical shape efficiently directs illumination from 4006 to a region 4007 near the top surface of the photocatalyst. Practical light sources are not in fact point sources but are extended, and the photocatalyst illumination target region is also extended, and therefore deviations from a perfect ellipsoid and point illumination source are in general desirable. The optimum shape of the interior reflective surface may thus be optimized together with the illumination source or source position, the photocatalyst mass and volumetric extent and the fluid flow characteristics.

FIG. 4b shows the same photocatalytic system under fluid flow conditions. Fluid 4008 is forcefully provided to the inlet and traverses the photocatalyst 4009 prior to exhaust 4010. Under these conditions the photocatalyst 4009 has a greater macroscopic bed volume that is approximately 5 times the static volume (FIG. 4a, 4001). The packing density is therefore about ⅕th the packed density. This bed density decrease facilitates the uniform illumination of the photocatalyst bed. Uniform illumination is also provided by the interior reflective surfaces that serve to return scattered illumination 4011 back to the photocatalyst.

Several interior reflective surfaces in these examples are exposed to fluidized catalyst, and it is desirable to prevent degradation of those reflective surfaces. (FIG. 2a 2003, FIG. 2b 2007, FIG. 3 3002, FIG. 4a 4002) Highly durable and abrasion resistant optical coating designs may be formed on the interior reflective surfaces in photocatalytic fluidized bed reactors. These designs may employ a base layer of aluminum that possesses a nominal reflectance of 92% in the visible and near UV. Pairs of low-index/high-index dielectric layers may be engineered on the aluminum, to enhance reflectance to higher levels over a range of target wavelengths. Table 2 shows a representative design with an outer layer of DLC, to increase abrasion resistance.

TABLE 2

Optical coating design of a high abrasion resistance enhanced high reflector (EHR) for 385 nm wavelength that employs DLC and aluminum oxide as the coating layers.

Figure 8:
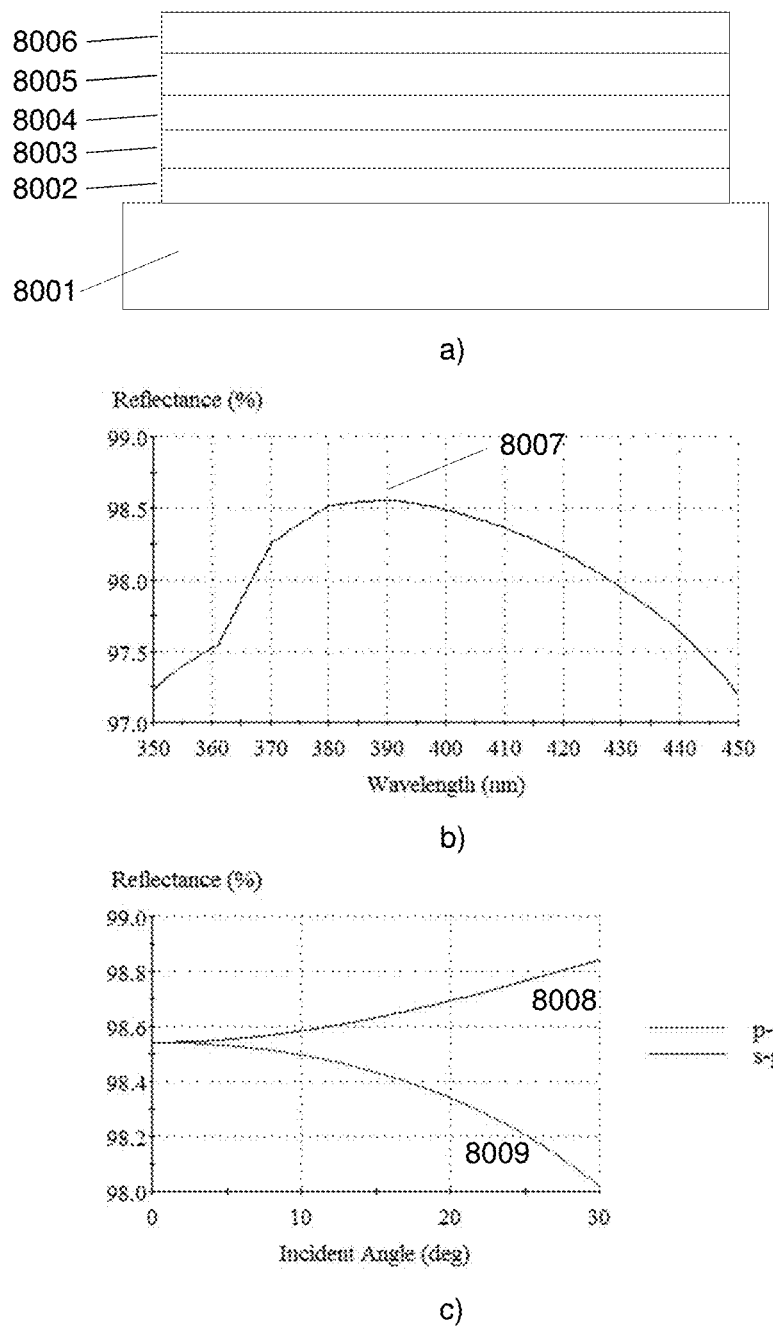
FIG. 8 is a schematic of an abrasion resistant enhanced high reflector coating and calculated spectral reflectance and R vs. angle of incidence.

| Material | FIG. 8a | Refractive index at 385 nm | Optical thickness (full waves at 385 nm) | Thickness (nm) |
| --- | --- | --- | --- | --- |
| Air | | 1.00 | | infinite |
| Diamond like carbon (DLC) | 8006 | 1.99 | 0.249 | 48.22 |
| SiO2 | 8005 | 1.47 | 0.250 | 65.33 |
| TiO2 | 8004 | 2.61 | 0.240 | 35.40 |
| SiO2 | 8003 | 1.47 | 0.214 | 55.85 |
| Aluminum | 8002 | 0.38 | 2.006 | infinite |
| Glass | 8001 | 1.53 | | |

FIG. 5a shows another Type 3 reactor variant that employs a cylindrical containment vessel 5002 that is transparent to the photocatalytic illumination. That transparent cylindrical containment vessel is fully defined by confinement elements at the inlet 5004 and the outlet 5005. These containment elements are conductive to the fluid flow but have pore or screen sizes that do not permit escape of the photocatalyst. The outlet element 5005 is also preferably transmissive with respect to the illumination, e.g., with transmittance greater than 50%.

The containment vessel is positioned in a non-imaging optical system that in this case is an interiorly reflective surface that is optimized to provide uniform illumination to the photocatalyst 5001 in the containment vessel.

FIG. 5b shows the subject reactor system under fluid flow conditions. Fluid is forcefully directed through the inlet 5010, and is incident on the photocatalyst 5011, which has an expanded macroscopic volume due to the fluidization effects. The exhaust fluid travels out of the reactor 5012. In this example a point source 5008 emits photocatalytic illumination that is incident on the photocatalyst both axially 5009 and radially 5009, i.e., after reflection from the interior reflector 5013.

The transparent containment vessel 5002 may have enhanced external transmittance by use of antireflection coatings. The interior AR coating is preferably fabricated with high hardness optical thin film materials. FIG. 6a shows a schematic 3 layer-antireflection coating, fabricated from relatively hard and abrasion resistant anti-wear materials: aluminum oxide (Al$_2$O$_3$), magnesium fluoride (MgF$_2$) and diamond like carbon (DLC). The outer layer of DLC provides improved abrasion resistance in the presence of fluidized photocatalysts. One optical design is optimized for use with 385 nm photocatalytic illumination, with these layer thicknesses given in Table 3.

TABLE 3

Optical coating design of a high abrasion resistant anti-reflection coating (AR) for 385 nm wavelength that employs DLC as the outer coating layer (top). A similar design without the DLC is shown for comparison (bottom).

| Material | FIG. 6a | Refractive index | Optical thickness (full waves at 385 nm) | Physical thickness (nm) |
| --- | --- | --- | --- | --- |
| Air | | 1.00 | | |
| Diamond like carbon (DLC) | 6004 | 1.99 | 0.021 | 4.0 |
| MgF2 | 6003 | 1.39 | 0.216 | 59.8 |
| Al2O3 | 6002 | 1.64 | 0.216 | 50.8 |
| Substrate | 6001 | 1.52 | | |
| Air | | 1.00 | | |
| MgF2 | 6003 | 1.39 | 0.243 | 69.2 |
| Al2O3 | 6002 | 1.64 | 0.243 | 58.8 |
| Substrate | 6001 | 1.52 | | |

The top 3-layer design employs a 4 nm DLC outer coat, and a similar 2-layer design parameters are also shown in the table immediately below the 3-layer parameters, but without the DLC overcoat. FIG. 6b shows spectral reflectance for these two AR coating designs. The 3-layer design with 4 nm DLC 6005, and the two-layer design with no DLC 6004. Both designs provide less than 0.5% reflectance at the 385 nm design wavelength, with the DLC degrading reflectance by about 0.2% absolute.

Figure 7:
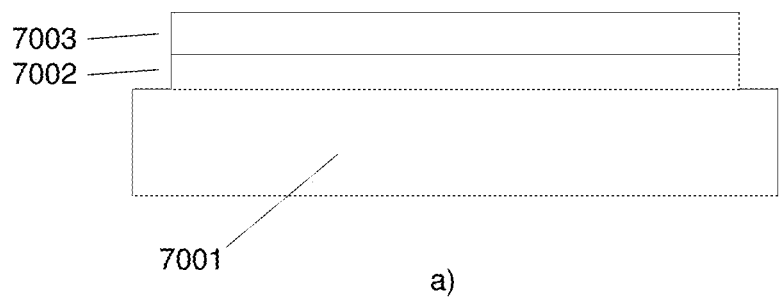
FIG. 7 is a schematic of an abrasion resistant antireflection coating, and calculated spectral reflectance showing R<0.05% at 385 nm wavelength.
Figure 7:
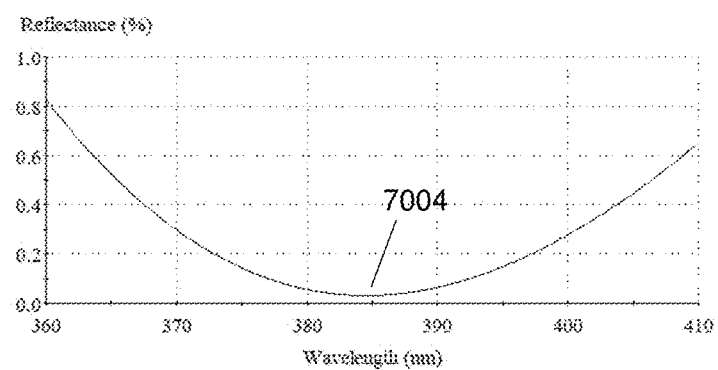

Another abrasion resistant antireflection coating is provided in FIG. 7. It is a two-layer design that employs DLC as the inner layer (adjacent to the glass substrate) and Al$_2$O$_3$ as the outer layer. A 385 nm optimized design uses layer parameters (Table 4). Spectral reflectance is shown in FIG. 7b, with a reflectance minimum 7004 of less than 0.05% reflectance at 385 nm.

TABLE 4

Optical coating design of a high abrasion resistant anti-reflection coating (AR) for 385 nm wavelength that employs DLC and alumina as coating layers.

| Material | FIG. 7a | Refractive index (at 385 nm) | Optical thickness (full waves at 385 nm) | Physical thickness (nm) |
|---|---|---|---|---|
| Air | | 1.00 | | |
| Al2O3 | 7003 | 1.64 | 0.250 | 58.7 |
| Diamond like carbon (DLC) | 7002 | 1.99 | 0.250 | 48.3 |
| Substrate | 7001 | 1.52 | | |

FIG. 8a shows the schematic of the 5-layer enhanced high reflector, with outer layer of DLC 8006. Thin film labels and optical/physical data are in Table 4. The other dielectric layers are $SiO_2$ 8003, 8005 and $TiO_2$ 8004. FIG. 8b shows spectral reflectance 8007 with a maximum of reflectance 98.5% at 385 nm. FIG. 8c shows reflectance vs incidence angle for 385 nm illumination, and reflectance is greater than 98% for both P-polarization 8008 and S-Polarization 8009 from normal incidence to 30° angles of incidence.

Where abrasion resistant coatings are used to protect highly transmissive components, such as the walls of the reaction zone that are constructed from ceramic materials such as quartz and glass especially in Type 1 and 2 reactors, the reaction zone wall will be coated with optically useful and abrasion resistant films of materials that are transparent to UV and visible light (wavelengths of 360-700 nm) and have high mechanical strength to resist abrasion. Certain illumination schemes may employ UVC and UVB (200-360 nm), and optical coating materials will be selected for those based on their mechanical and optical properties. Aluminum oxide is particularly useful because it has high transmission to below 200 nm wavelength. The coating may be made of materials such as aluminum oxide, zirconium oxide, diamond like carbon (DLC), and chromium oxide. For Type 3 photocatalytic reactor systems that have metalized walls, aluminum oxide, zirconium oxide, diamond like carbon, and chromium oxide can be used to protect the walls.

For photoreactors that use optical components such as mirrors, lenses, emissive surfaces within the reaction zone, or light guides, the optical components may be coated with 1-40 nm films of 150-600 nm transparent abrasion-resistant materials such as aluminum oxide, zirconium oxide, diamond like carbon, and chromium oxide.

Attrition of optical systems, especially of reactor walls composed of quartz or glass, may result in a change in the efficiency of the photocatalytic process over the lifetime of the catalyst. Efficiency improvement may come about when attrition of the inner wall of a quartz tube causes the glass to frost, increasing the scattering coefficient of the quartz without loss of transmissivity which can lead to more uniform initial illumination.

In one embodiment an LED light source or LED light sources are mounted directly onto a highly reflective surface such as a mirror that also contains a heat sink. The LED(s) can be placed either outside the reaction zone or be part of the walls of the reaction zone itself. The heat sink can be passively or actively cooled. The reflective surface onto which the LED(s) is mounted will allow the fraction of light that is scattered by the photocatalyst away from the reaction zone to be re-reflected toward the reaction zone while minimizing the volume occupied by the light source.

In one embodiment the emission from an LED light source is focused using a series of lenses and mirrors into a lightguide that is inside the reaction zone. The lightguide can be parallel or perpendicular to the direction of fluid flow inside the reaction zone. The length of the lightguide is 90-100% the length of the critical axis in the reaction zone and allows light to emit from the entire length of the guide. It is also possible to have an LED source on both sides of the lightguide to increase the optical power entering the reaction zone. The surface of the lightguide can be engineered to control the scattering angle of light leaving the lightguide.

In one embodiment, reactor temperature is controlled. Although not wishing to be bound by theory, it is believed that temperature may be modified to improve the kinetics of a chemical transformation, to provide requisite energy to activate a chemical transformation, or to help achieve the desired reaction selectivity. One approach to heating the reaction area is to use heat wire or heat tape that is inside the reaction zone. A preheater or heat exchanger at the fluid inlet may be used to control the temperature of input gases or liquids that are arriving from downstream processes or entering the reactor for the environment. A second post heater or heat exchanger may control the outlet fluid temperature before discharge into the environment or before another processing step. In this embodiment of the reactor, a desirable operating temperature range is between 20 and 150° C., in a further embodiment the temperature may be in a range of 51 to 139° C.

In another approach to control temperature, the excess heat generated by the light source is transferred to the reaction zone, fluid inlet, and fluid outlet preferably by directing fluid exhaust from light source cooling to the photoreactor vessel, or through a heat exchanger. The light source cooling fluid may be air or a suitable liquid coolant such as water or propylene glycol. Temperature may be further controlled by passing a fraction of the fluid flow over the heat sink connected to the light source. The fluid used for temperature control may be recirculated back through the reactor after or discharged into the environment. Discharge is only advised if the process is carried out in a closed loop to avoid process waste.

In another approach, waste heat may be communicated to an energy harvesting device, such as a thermoelectric material where the Seebeck effect is used to convert the thermal energy to electrical energy. The harvested electrical energy can be used to drive a fan or other device that provides the fluidization. Thus, a portion of the wasted energy can be recovered to provide a portion of the energy needed to fluidize the photocatalyst in the reactor. The thermoelectric device is placed in contact with a heat sink that removes heat from an LED source that illuminates the photoreactor.

For Type 3 reactors, the reaction zone can be heated either by heat wires or tape inside the reaction zone or from a furnace surrounding the reaction area but the furnace does not heat the light source. If optics such as mirrors, lenses, or light guides are used, the optics are either inside or outside the photoreactor.

One approach to conserve power or control deleterious side reactions is to control the availability of reactive sites on the photocatalyst surface. To achieve this goal, the optical power of the light source may be modulated based on feedback of the composition of the fluid in the outlet fluid stream. For some applications the spectral character of this illumination may also be modulated or actively controlled.

In one embodiment, reactor pressure is controlled. Although not wishing to be bound by theory, the pressure of the reactor can influence the products of a chemical transformation, the reaction rate, the selectivity of a chemical transformation, and particle fluidization. Methods to control pressure include but are not limited to changing the inlet fluid flow rate, pressurizing the reaction zone, or changing the amount of photocatalyst in the reaction zone.

An aspect of the photocatalytic reactor system is to have a discrete area, known as a regeneration zone, for the regeneration of the photocatalyst to recover the lost performance due to poisoning or some other form of deactivation by the time it reenters the reaction zone. There are several approaches for the catalyst to transport into the regeneration zone. In one approach, a fraction of the photocatalyst will "carry-over" or be entrained in the fluid stream out of the top of the reactor by the fluid flow and be directed by the fluid stream or gravity into the regeneration zone. Apparatuses such as cyclones can be used to separate the photocatalyst from the fluid stream. At no time will greater than 25% of the total catalyst in the photocatalytic reactor system be in the regeneration zone. In another approach, a gated opening in the side of the reactor can be opened to allow the photocatalyst to enter the regeneration zone until up to 25% of the total catalyst has entered the regeneration zone. The regeneration zone is an independent area with the same or different geometry from the initial reaction area. It can also be an annular tube on the inside or outside of a cylindrical photoreactor. The regeneration zone can have an independent heat or illumination source. An independent clean fluid, fluid from the reaction zone outlet, or fluid containing a chemical that reacts with or competitively adsorbs to the catalyst surface can be used to fluidize or pass over the photocatalyst in the regeneration zone. For heating, the adsorbed by-products will desorb from or decompose on the catalyst surface. The temperature is maintained sufficiently low to avoid sintering or denaturing the active sites.

In another embodiment, the regeneration zone can be illuminated to use the photocatalytic effect to decompose or desorb the adsorbed by-products on the photocatalyst surface. The regeneration zone can also be fluidized by an inert fluid stream or with a fraction of the primary fluid stream, especially in the case of a closed loop system, but the fluidization of the regeneration zone will be low enough that there is not reverse spillover from the photocatalyst that would be routed toward the primary reaction zone. After treatment, the photocatalyst is reintroduced into the main reaction zone. One way to accomplish this is by a feed tube whose slope and inner diameter is such that the fraction of photocatalyst entering and leaving the regeneration zone is constant. The photocatalyst can also be reintroduced into the reaction zone by a gated opening that spills the photocatalyst from the regeneration zone to the reaction zone. The size of the regeneration zone and residence time therein is such that the photocatalyst recovers at least 50% of its initial activity.

A related aspect of the invention for all types of photocatalytic reactors systems is the active photocatalytic media (i.e., "photocatalyst"). The media should be both fluidizable and have sufficiently low attrition, less than 3 wt %/h per ASTM D5757, to prevent the formation of fines that would shorten the photocatalyst lifetime and escape the photoreactor, degrading performance, and/or block downstream systems, causing higher pressure drops, blocked flow, and reactor failure. Fine-particle collection systems such as a cyclone or removable filters can be used to collect fines lost during operation without burdening downstream systems. Low attrition is an important feature of the photocatalyst to enable operation of the photocatalytic reactor system over a useful time period.

The $N_2$ BET (Brunauer-Emmett-Teller) surface area of the photocatalyst is at least 10 $m^2/g$, from 10-900 $m^2/g$, preferably 20-800 $m^2/g$, and most preferably 50-600 $m^2/g$. Without wishing to be bound by theory, it is expected that this porosity can be utilized to adsorb the target species to bring it close to the surface-bound photoactive nanocrystals for oxidation. The rapid adsorption and large surface area provided by the porous photocatalysts preclude the need for a separate adsorption step before light-activated transformations are commenced.

The photoactive component or components in the photocatalyst may include but are not limited to titanium oxide, zinc oxide, bismuth oxide, tungsten oxide, molybdenum sulfide, gallium phosphide, silicon carbide, cadmium sulfide, and modified compositions of these compounds with other dopants tuned to maximize performance at the desired wavelength of incident light. The photocatalyst may be comprised of 100% of this photoactive component, or the photoactive component may be present in the photocatalyst at less than 100%, in combination with a non-photoactive component. A photocatalyst that is a mixture of photoactive and non-photoactive components may be specified in this invention as a "composite photocatalyst" or more simply as a "photocatalyst".

In one embodiment, monolithic composite photocatalysts previously disclosed in provisional application 62/760,428 comprise discrete, immobilized photocatalyst (<5 nm) well-adhered to solid supports with low attrition, high surface area, and variable form factors. The shape and size of these composite photocatalysts can be tuned to achieve critical fluidization regimes and the necessary robustness to withstand losses from attrition.

Composite photocatalysts can be specifically tuned to optimally mineralize or chemically transform the species of interest under the reaction conditions in the relevant environment. The form factor can be selected to optimize fluidization and physical robustness from various beads and extrudate shapes. Diameters in the range of 20-600 µm demonstrate good fluidization properties. Different composite photocatalyst supports, fillers, or binders can be used as the non-photoactive component. By way of example, these non-photoactive components can be zirconia, titania, silica-titania, alumina, silica, zeolites, or combinations thereof. The support composition may be chosen to impart wear-resistance to the fluidized media, decreasing attrition.

The porosity of the support and pore size may play a role in performance. In one embodiment, the composite photocatalyst is mesoporous with pores from 2-50 nm, more preferably 4-450 nm, and most preferably 6-40 nm as determined from BJH (Barrett-Joyner-Halenda) analysis or DFT (density functional theory) analysis of $N_2$ isotherm data collected at 77 K. Pore volume is 0.2-1.5 cc/g, more preferably 0.4-1.0 cc/g as determined from DFT analysis of $N_2$ isotherms collected at 77 K.

A single photocatalyst type may be used in the reactor and/or more than one photocatalyst differing in at least one property from among particle size, shape, pore size, surface area, pore volume, composition, surface properties can be combined in a reactor. Combining multiple photocatalyst types in a single reactor may offer advantages during chemical transformations, particularly when the stream contains multiple components differing in size and polarity. This approach may be appropriate where it has been shown that different photocatalyst types are optimized for different species and can preferentially adsorb and/or mineralize these species. Alternately, different reactors housing a single composite photocatalyst type may be placed in series to improve total mineralization rates of a mixed component stream.

In one aspect of the invention, the photocatalyst and fluidized bed photoreactor are used to mineralize a single organic species or VOC or multiple organic species or VOCs in a fluid. A related aspect of the invention is the application of these photocatalytic fluidized bed reactor systems to achieve chemical transformations typically achieved with traditional thermal catalysts. The use of photocatalysts in fluidized beds may facilitate these transformations at lower pressures or lower temperatures than traditional thermal catalysts. The fluidized bed photoreactor, photocatalyst, and the reaction conditions employed can be tailored to achieve the desired product in high yield with high selectivity. Reaction conditions can include light alone or in combination with heat and or/pressure to achieve the desired outcome. Examples of organic transformations photocatalyzed in the fluidized bed reactors described herein include controlled oxidation reactions of organic molecules, epoxidation of alkenes, hydroxylations, $CO_2$ reduction, conversion of NO to $N_2$ and $O_2$, and C—H activation reactions, particularly for light hydrocarbons.

Photocatalysis can allow for chemical transformations to proceed at lower pressures, even atmospheric pressure, than traditional thermal catalysis. In processes that require elevated pressure, the operating pressure can be more moderate than the high pressure used in analogous thermal catalytic processes. Pressure greater than atmospheric may also enable photocatalytic transformations that are not possible using thermal catalysis. In one aspect of the invention, pressure within the reaction chamber may be modified to achieve specific chemical transformations. Conversion of $CO_2$ to methane or methanol, for example, may require pressures greater than 1 bar, preferably 1-20 bar, more preferably 2-10 bar. Without wishing to be bound by theory, it is thought that elevated pressures in chemical transformations can affect reagent solubility, reaction rate, product selectivity, and yield.

In one embodiment, particles which are transparent to the incident radiation are added to the reaction chamber with the photocatalyst. Transparent particles allow the incident light to travel further into the fluidized bed while also allowing fluidization regime to be controlled. Alternatively, highly scattering (i.e. diffuse reflective) particles can be added to the reactor to improve light uniformity within the reactor. A combination of scattering and transmissive particles may be used. The added non-photocatalytic particles do not need to have the same size or density of the photocatalytic particles.

Figure 9:
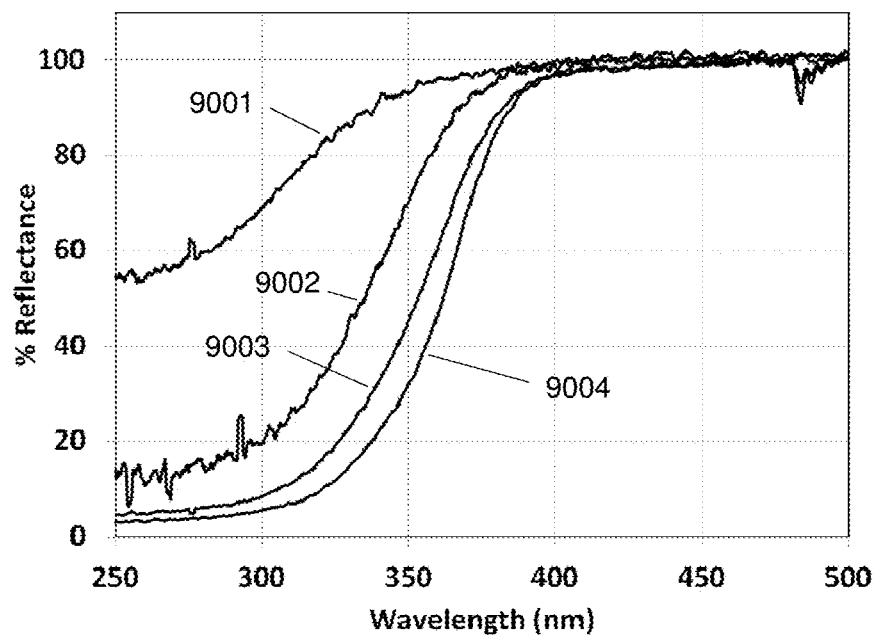
FIG. 9 shows spectral reflectance for four different monolithic composite photocatalysts.

In a preferred embodiment the optical absorbance and optical scattering properties of the photocatalyst are engineered to maximize the optical intensity and spatial uniformity of optical intensity incident on the photocatalyst. FIG. 9 shows spectral reflectance for four different variations of the monolithic composite photocatalyst. These data were measured at near normal incidence using a bifurcated fiber reflectance probe used with a diode array spectrometer and a pulsed Xenon discharge source. These monolithic composite photocatalysts employ alumina as the support, and the measurements are relative to uncoated alumina, i.e. spectral reflectance of uncoated alumina is defined as 100%. These materials are most useful near the absorption edge, i.e. where the reflectance is monotonically decreasing with wavelength. For these materials that spectral range is approximately from 380-420 nm. The wavelength dependence of the catalysts spectral reflectance and absorbance may be engineered via nanocrystal size of the active titania on the support, support pore size, support surface area and active titania loading. Relative absorbance A is calculated by $A=1-R$, (with R=reflectance), since transmittance was shown to be zero under these conditions.

Table 5 summarizes the measured reflectance taken from the FIG. 9 spectral data and calculated absorbance at two technologically useful wavelengths, 365 nm and 385 nm. These correspond to commercially available high intensity LED emitters that are useful as photocatalytic illumination. These devices operate near peak wall plug efficiency for InGaN LED devices, approximately 48% and 52%. Both wavelengths are very effective at stimulating photocatalytic activity in the subject materials. A range of absorbance levels may be achieved by varying the illumination wavelength and material absorbance properties. In general, lower values for absorbance, i.e. less than 10%, may be achieved either by operating at 385 nm or for Sample Types 1 and 2, thereby enabling light penetration deeper into the fluidized photocatalyst bed. Higher absorbance values, i.e. greater than 10%, may be achieved at 365 nm for Sample types 2, 3 and 4. Higher absorbance is useful for shallow photocatalyst bed configurations.

Other photocatalytic illumination wavelengths accordingly offer additional flexibility for photoreactor design and photocatalyst material type. Wavelengths in the 250 nm to 420 nm wavelength range are of the greatest interest. For a given material, illumination at multiple wavelengths enables a wide range of photocatalyst bed penetration depths.

TABLE 5

Reflectance and relative absorbance at 365 nm and 385 nm for four engineered monolithic composite photocatalyst materials, from FIG. 9. A range of absorbance values are available to optimize optical coupling in the subject photoreactors.

| Sample Type | FIG. 9 | Reflectance | | Absorbance (relative) | |
| --- | --- | --- | --- | --- | --- |
| | | R (365 nm) | R (385 nm) | A (365 nm) | A (385 nm) |
| 1 | 9001 | 94% | 96% | 6% | 4% |
| 2 | 9002 | 86% | 94% | 14% | 6% |
| 3 | 9003 | 70% | 92% | 30% | 8% |
| 4 | 9004 | 57% | 90% | 43% | 10% |

EXAMPLES

Example 1

Figure 10:
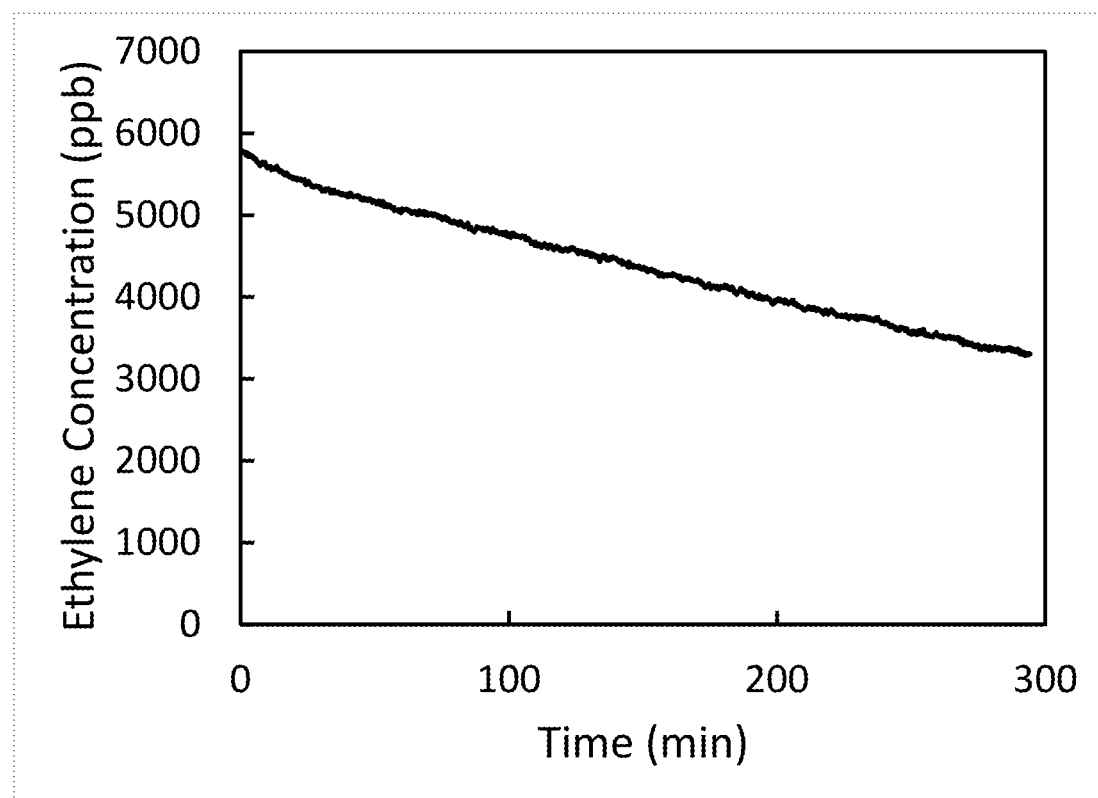
FIG. 10 shows ethylene concentration vs. time for a fluidized bed photocatalytic reactor system.

The photocatalytic oxidation of ethylene gas to $CO_2$ and $H_2O$ was performed in a closed loop, 100 L test environment comprising a photocatalytic reactor system of Type 3, an ultrasonic humidifier, a humidity controller, and a photoionization detector. The photocatalytic reactor system is similar to that depicted in FIG. 3 and consists of a 2.7 W, 365 nm LED mounted on a heat sink and suspended above the photocatalyst. The LED was operated at full power. The photocatalyst was housed in a conical reactor and held in place by stainless steel meshes above and below the reactor. Fluidization was provided by a variable speed axial fan mounted 2" from the bottom of the photocatalyst, and all the air was directed through the photocatalytic reactor system using a tube. The relative humidity of the system was maintained at 60%. No additional water was added after the initial relative humidity level was reached. A 10 ppm ethylene cylinder, balanced with air, was used to introduce a charge of contaminated air into the system until the total ethylene level reached 6 ppm, at which point the LED source was switched on. The level of ethylene was continuously monitored using a PID detector for the course of 300 minutes. The resulting decrease in the ethylene level with time is shown in FIG. 10.

Example 2

The photocatalytic oxidation of toluene to $CO_2$ and $H_2O$ was performed using a continuous 600 sccm, 2 ppm toluene flow that passes once through a photocatalytic reactor of Type 1. The photocatalytic reactor consists of a linear array of 22 365 nm LEDs that are spaced ½" apart mounted to a heat sink, however, only 3 LEDs are in direct line of site of the photocatalyst. The photocatalyst was housed in a 7 mm inner diameter quartz tube that was aligned vertically and parallel to the LED strip which sits 10 mm away. A reflector was placed on the back side of the reactor. Fluidization was achieved using the 600 sccm polluted gas flow and the photocatalyst was positioned vertically in the tube using a plug of quartz wool. An equilibrium flow of toluene was established for 10 minutes through the reactor before illumination. After illumination, the concentration of toluene was reduced to 0 ppb (limits of detection) of a PID detector calibrated for toluene and remained at that level for the duration of illumination time, 10 min. After the LEDs were turned off the 2 ppm toluene signal returned.

Example 3

The photocatalytic oxidation of toluene to $CO_2$ and $H_2O$ was performed using the same setup as Example except the quartz tube used had been worn due to attrition by 300 mg of catalyst for 6 weeks at a flow of 1000 sccm. The toluene conversion of the worn tube and a new quartz tube were compared. The transmission of the worn tube was 2× lower than the new tube when measured normal to an LED source with the reactor tube in between. The concentration of toluene was 3 ppm for Example 3. Using the same lights source and reactor geometries, the concentration of toluene decreased to ~100 ppb for reactor tubes despite the difference in light transmission indicating attrition did not adversely affect performance.

Example 4

The photocatalytic oxidation of a humidified air stream containing isopropanol and ethylene in a 1:3 ratio can be enhanced using two composite photocatalysts in a fluidized bed reactor. The properties of each composite photocatalysts are optimized to maximize the conversion of either isopropanol or ethylene. Ethylene is a small, non-polar molecule that weakly interacts with the TiO2 surface, whereas isopropanol is larger, polar, and interacts strongly with TiO2, especially under UV illumination, where it outcompetes ethylene for photocatalytic sites. One photocatalyst is modified to have smaller pores to enhance ethylene adsorption and limit isopropanol adsorption. The second photocatalyst comprises larger pores to reduce ethylene adsorption and maximize isopropanol diffusion kinetics and photocatalytic conversion. Upon illumination of the mixed photocatalyst bed with 365 nm light, removal of both species can be achieved rather than preferential removal of one component over the other in a fluidized bed containing a single photocatalyst species.

The subject invention may be embodied in the following examples that are by no means restrictive, but intended to illustrate the invention. In particular, aspects of the various examples and embodiments may be combined to comprise variations of this invention. It will be clear that the described invention is well adapted to achieve the purposes described above, as well as those inherent within. The citation of any publication is for its disclosure prior to the filing date and should not be construed as an admission that the present invention is not entitled to antedate such publication by virtue of prior invention. Numerous other changes may be made which will readily suggest themselves to those skilled in the art and which are encompassed both in the spirit of the disclosure above and the appended claims.

What is claimed is:

1. A photocatalytic reactor system for performing chemical transformations in a fluid, the reactor system comprising: a fluidizable inorganic composite photocatalyst comprising a photoactive catalyst disposed on a non-photoactive material with a $N_2$ BET surface area in the range from 50 to 600 $m^2/g$ and with attrition less than 3 wt %/h, the reactor system further comprising a photoreactor that contains the fluidizable inorganic composite photocatalyst, the reactor system further comprising an illumination source in a wavelength range of 250-420 nm that directs-photocatalytic illumination into the photocatalyst, the reactor system further comprising a mechanical means to fluidize the inorganic composite photocatalyst.

2. The fluidizable composite photocatalyst of claim 1, wherein the photoactive catalyst comprises $TiO_2$, and the non-photoactive material comprises $Al_2O_3$.

3. The photocatalytic reactor system of claim 1, wherein the inorganic composite photocatalyst contains pores with sizes in the 2-50 nm range.

4. The photocatalytic reactor system of claim 1, wherein the inorganic composite photocatalyst comprises particles having mean diameter from 20-600 μm.

5. The photocatalytic reactor system of claim 1, wherein the illumination source has output primarily in the wavelength range of 360-390 nm.

6. The photocatalytic reactor system of claim 5, wherein the illumination source comprises a light emitting diode.

7. The photocatalytic reactor system of claim 5, further comprising an illumination source that has output in the range of 420-2800 nm, thereby being effective for photocatalyst heating.

8. The photocatalytic reactor system of claim 1, wherein the illumination source directs photocatalytic illumination primarily in an axial direction relative to a cylindrical photocatalyst bed of the inorganic composite photocatalyst in the photocatalytic reactor system.

9. The photocatalytic reactor system of claim 8, wherein fluid flow is provided primarily in an axial direction relative to a cylindrical photocatalyst bed of the inorganic composite photocatalyst in the photocatalytic reactor system.

10. The photocatalytic reactor system of claim 1, wherein the fluidizable inorganic photocatalyst forms a photocatalytic bed with voidage which is greater than 0.36.

11. The photocatalytic reactor system of claim 1, wherein the interior walls of the reactor system comprise reflective elements to direct photocatalytic illumination onto the fluidized inorganic photocatalyst which forms a photocatalytic bed.

12. The photocatalytic reactor system of claim 11, wherein the reflective elements have reflectance greater than 90% at the photocatalytic illumination wavelengths of 365 nm or 385 nm.

13. The photocatalytic reactor system of claim 11, wherein the reflective elements exposed to the fluidized photocatalyst are coated with a transparent abrasion resistant coating.

14. The photocatalytic reactor system of claim 11, wherein the reflective elements utilize dichroic or reflective coatings.

15. The photocatalytic reactor system of claim 11, wherein the abrasion resistant coating is selected from the group consisting of a ceramic, diamond, and diamond like carbon material.

16. The photocatalytic reactor system of claim 1, wherein photocatalyst reflectance is between 40% and 95% at photocatalytic illumination wavelengths of 365 nm or 385 nm.

17. The photocatalytic reactor system of claim 1, which is operated between 20° C. and 150° C.

18. The photocatalytic reactor system of claim 1, wherein at least two different inorganic composite photocatalysts differing in at least one property selected from the group consisting of surface area, pore size, photoactive catalyst material, and non-photoactive material comprise the fluidized inorganic photocatalyst which forms a photocatalytic bed in the photocatalytic reactor system.

19. The photocatalytic reactor system of claim 18, wherein at least two different inorganic composite photocatalysts differing in photoactive catalyst material comprise the fluidized inorganic photocatalyst which forms a photocatalytic bed in the photocatalytic reactor system.

20. The photocatalytic reactor system of claim 18, wherein the different inorganic composite photocatalysts are provided to mineralize specific different components of a fluid stream used to fluidize the fluidized inorganic photocatalyst which forms a photocatalytic bed.

21. The photocatalytic reactor system of claim 1, which is used to mineralize a VOC or organic species.

22. The photocatalytic reactor system of claim 21, which uses the incoming gas stream to be mineralized as the mechanical means to achieve fluidization.

23. The photocatalytic reactor system of claim 1, which is used to transform a VOC or organic species to a selected product or products.

24. The photocatalytic reactor system of claim 1, which incorporates a regeneration zone.

* * * * *